(12) United States Patent
Burgess et al.

(10) Patent No.: US 11,028,950 B2
(45) Date of Patent: Jun. 8, 2021

(54) PIPE COUPLING

(71) Applicant: CRANE LIMITED, Hertfordshire (GB)

(72) Inventors: Richard Burgess, Hertfordshire (GB); Paul Clark, Bedfordshire (GB)

(73) Assignee: CRANE LIMITED, Hertfordshire (GB)

( * ) Notice: Subject to any disclaimer, the term of this patent is extended or adjusted under 35 U.S.C. 154(b) by 124 days.

(21) Appl. No.: 15/790,261

(22) Filed: Oct. 23, 2017

(65) Prior Publication Data
US 2018/0112804 A1  Apr. 26, 2018

(30) Foreign Application Priority Data

Oct. 21, 2016 (GB) .................................. 1617849.3

(51) Int. Cl.
| | |
|---|---|
| *F16L 37/086* | (2006.01) |
| *F16L 19/08* | (2006.01) |
| *F16L 21/08* | (2006.01) |
| *F16L 37/091* | (2006.01) |
| *F16L 47/12* | (2006.01) |

(52) U.S. Cl.
CPC ............. *F16L 19/086* (2013.01); *F16L 21/08* (2013.01); *F16L 37/091* (2013.01); *F16L 47/12* (2013.01)

(58) Field of Classification Search
CPC ....... F16L 37/091; F16L 37/086; F16L 47/12; F16L 17/04
USPC ........................................................ 285/340
See application file for complete search history.

(56) References Cited

U.S. PATENT DOCUMENTS

| | | | | |
|---|---|---|---|---|
| 2,225,208 A | * | 12/1940 | Crickmer ............... | F16L 37/091 285/104 |
| 2,459,251 A | * | 1/1949 | Stillwagon .............. | F16L 17/04 285/340 |
| 2,995,388 A | * | 8/1961 | Morello, Jr. .......... | F16L 19/086 285/340 |
| 2,999,701 A | * | 9/1961 | Blair ..................... | F16L 19/086 285/340 |
| 3,582,112 A | * | 6/1971 | Pico ........................ | F16L 17/10 285/96 |
| 3,790,194 A | | 2/1974 | Kimberley | |

(Continued)

FOREIGN PATENT DOCUMENTS

| | | |
|---|---|---|
| CA | 2 731 852 A1 | 8/2012 |
| CN | 205261094 U | 5/2016 |

(Continued)

*Primary Examiner* — David Bochna
(74) *Attorney, Agent, or Firm* — Renner, Otto, Boisselle & Sklar, LLP

(57) ABSTRACT

A pipe connector or coupling for providing a coupling to a pipe, the pipe coupling comprising: at least one gripper ring which receives a pipe therewithin, wherein the at least one gripper ring comprises a gripper which includes a plurality of blade elements which are displaceable between a first, pipe-receiving configuration in which the pipe is receivable within the at least one gripper ring and a second, inwardly-displaced inserted configuration in which the blade elements are inserted into an external wall of the pipe; and a clamp for applying a radially-inward compressive load on the at least one gripper ring to displace the blade elements thereof from the pipe-receiving configuration to the inserted configuration.

13 Claims, 15 Drawing Sheets

(56) References Cited

U.S. PATENT DOCUMENTS

| | | | | |
|---|---|---|---|---|
| 4,629,217 A * | 12/1986 | Straub | F16L 17/02 | 285/373 |
| 5,094,467 A * | 3/1992 | Lagabe | F16L 37/0845 | 285/374 |
| 5,911,446 A * | 6/1999 | McLennan | F16L 17/04 | 285/340 |
| 6,206,434 B1 * | 3/2001 | Schreiter | F16L 17/04 | 285/340 |
| 7,121,593 B2 * | 10/2006 | Snyder, Sr. | F16L 37/091 | 285/340 |
| 8,430,432 B2 * | 4/2013 | Webb | F16L 17/04 | 285/340 |
| 2002/0171244 A1 * | 11/2002 | Wachter | F16L 21/06 | 285/373 |
| 2005/0104369 A1 * | 5/2005 | Webb | F16L 21/065 | 285/340 |
| 2009/0140520 A1 * | 6/2009 | Krausz | F16L 21/022 | 285/340 |
| 2010/0194104 A1 * | 8/2010 | Hennemann | F16L 37/091 | 285/330 |
| 2011/0012339 A1 * | 1/2011 | Hennemann | F16L 37/091 | 285/39 |
| 2014/0197632 A1 * | 7/2014 | Hennemann | F16L 37/091 | 285/319 |
| 2015/0021911 A1 * | 1/2015 | Bowman | F16L 41/021 | 285/340 |
| 2015/0308595 A1 | 10/2015 | Lee | | |

FOREIGN PATENT DOCUMENTS

| | | | |
|---|---|---|---|
| EP | 1164325 A2 | 12/2001 | |
| EP | 1292792 | 4/2008 | |
| FR | 2883951 A1 * | 10/2006 | F16L 27/108 |
| GB | 1 392 937 | 5/1975 | |
| GB | 2 249 366 A | 5/1992 | |
| GB | 2516452 A | 1/2015 | |
| WO | 01/90608 A1 | 11/2001 | |
| WO | 2010/035924 | 4/2010 | |
| WO | 2015/030506 | 3/2015 | |

* cited by examiner

PIPE COUPLING

This application claims priority of United Kingdom Patent Application No. 1617849.3 filed Oct. 21, 2016, which is hereby incorporated herein by reference.

The present invention relates to a pipe coupling for providing a fluid-tight coupling to pipes, and especially plastic pipes, and in particular PE pipes.

BACKGROUND OF THE INVENTION

Numerous pipe couplings exist for coupling plastic pipes, for example, as disclosed in the applicant's earlier EP-A-1164325 and EP-A-1292792.

These pipe couplings require, however, very high radial compression loads, and associated bolt torques, in order to crush gripper elements of the couplings against the periphery of the pipe sufficiently to prevent release of the pipes from the couplings under normal, operative axial loads.

The extent of these compressive loads is such as to require the use of an internal stiffening liner, typically formed of stainless steel of coated mild steel, within the pipe in order that the pipe can withstand the crush loading without collapsing.

Moreover, these existing pipe couplings usually require a compression seal, the efficiency of which is determined by the radial compression, and thus there are competing factors in requiring a predetermined radial compression to ensure optimal sealing of the compression seal, but requiring an often-higher radial compression in order to ensure sufficient grip on the pipe.

BRIEF SUMMARY OF THE INVENTION

It is an aim of the present invention to provide a pipe coupling which enables operation with much lower compressive loading of pipes, and can allow in some embodiments for use without a stiffening liner.

In one aspect the present invention provides a pipe connector or coupling for providing a coupling to a pipe, the pipe coupling comprising: at least one gripper ring which receives a pipe therewithin, wherein the at least one gripper ring comprises a gripper which includes a plurality of blade elements which are displaceable between a first, pipe-receiving configuration in which the pipe is receivable within the at least one gripper ring and a second, inwardly-displaced inserted configuration in which the blade elements are inserted into an external wall of the pipe; and a clamp for applying a radially-inward compressive load on the at least one gripper ring to displace the blade elements thereof from the pipe-receiving configuration to the inserted configuration.

In another aspect the present invention provides a gripper ring for a pipe connector or coupling which receives a pipe therewithin, wherein the gripper ring comprises a gripper which includes a plurality of blade elements which are displaceable between a first, pipe-receiving configuration in which the pipe is receivable within the gripper and a second, inwardly-displaced inserted configuration in which the blade elements are inserted into an external wall of the pipe.

In a further aspect the present invention provides a carrier member for a pipe connector or coupling, wherein the carrier member includes a recess for receiving a blade element and has first and second side axial faces for engaging a recess in a clamp, first and second end circumferential faces and inner and outer radial faces, with the axial faces defining a tapered or wedge shape.

BRIEF DESCRIPTION OF THE DRAWINGS

Preferred embodiments of the present invention will now be described hereinbelow by way of example only with reference to the accompanying drawings, in which:

FIGS. 1 to 5 illustrate a pipe coupling or connector in accordance with a first embodiment of the present invention.

DETAILED DESCRIPTION

Figure 1:
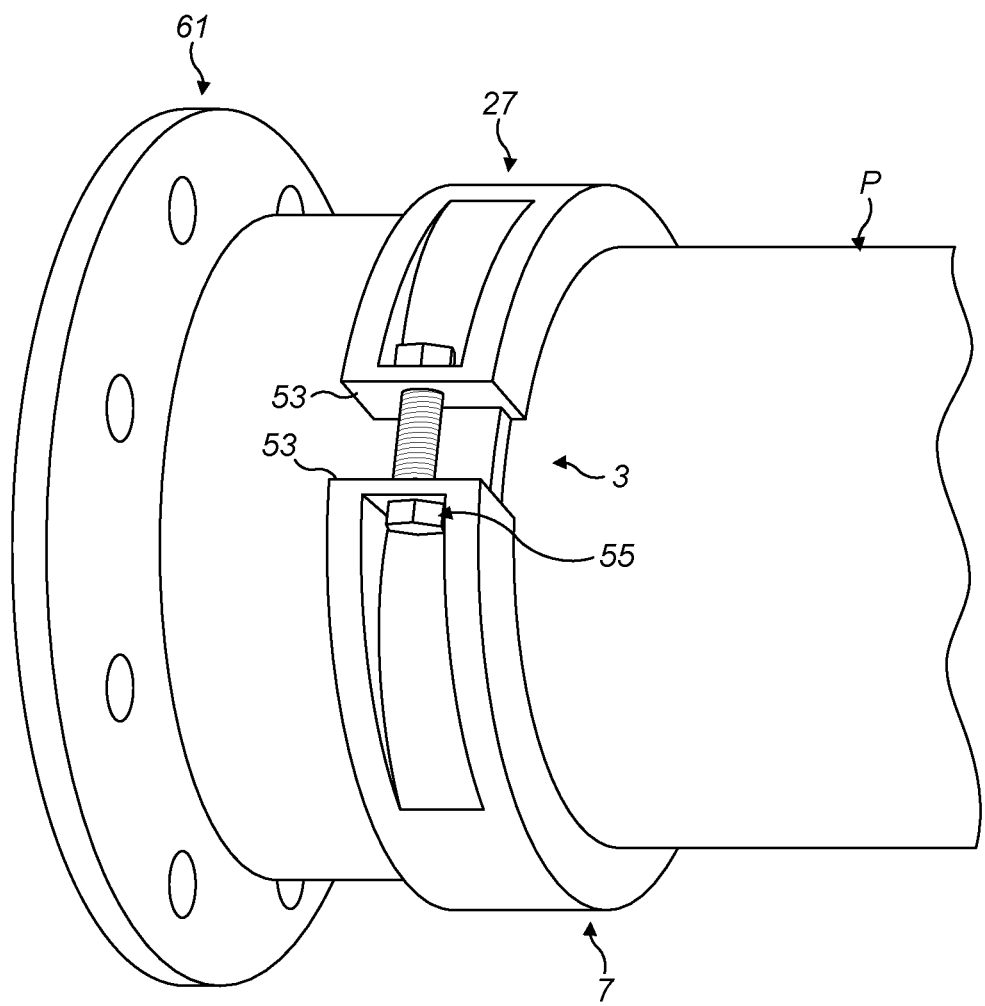
FIG. 1 illustrates a perspective view of a pipe coupling in accordance with a first embodiment of the present invention where fitted to a pipe end.

The pipe coupling comprises an annular gripper ring 3 which receives a pipe P therewithin, and a clamp 7 which acts to apply a radially-inward compressive load on the gripper ring 3 in order to displace the gripper ring 3 against an external peripheral surface S of a wall W of the pipe P, as will be described in more detail hereinbelow.

In this embodiment the gripper ring 3 comprises a gripper 11 which is inserted into the external surface S of the pipe P when the gripper ring 3 is clamped to the pipe P by operation of the clamp 7, and a carrier 15 which supports the gripper 11 with a defined orient in relation to the external surface S of the pipe P.

In this embodiment the gripper 11 comprises a plurality of blade elements 17, which are arranged in circumferential relation and, when clamped to the pipe P by the clamp 7, are inserted into the external surface S of the pipe P, here cutting into the external surface S of the pipe P.

In this embodiment the blade elements 17 each have a main body section 17a by which the blade element 17 is supported with a predetermined orient in relation to the external surface S of the pipe P, an external edge section 17b by which the blade element 17 is displaced inwardly during operation of the clamp 7, and an internal edge section 17c which provides a blade 18 which is inserted into the external surface S of the pipe P, here cutting into the external surface S of the pipe P, in order to engage the pipe P.

In this embodiment the blade elements 17 are configured such that the blades 18 are inserted into the external surface S of the pipe P at a predetermined angle thereto.

Figure 2:
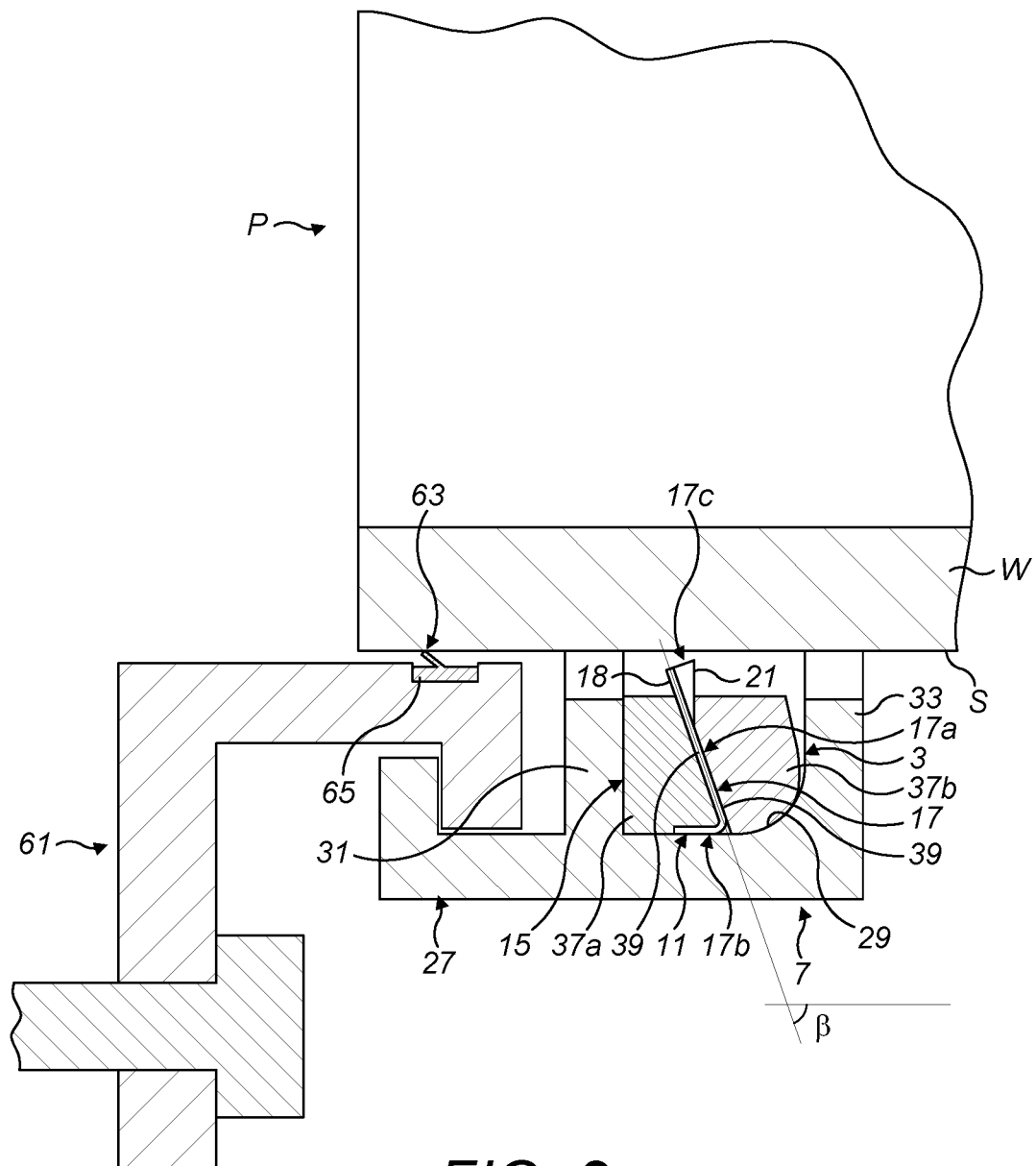
FIG. 2 illustrates a longitudinal sectional view of the pipe coupling of FIG. 1 when located over the pipe end and before application of any radial, compressive loading of the pipe coupling.

In this embodiment the blades 18 are inclined in relation to the external surface S of the pipe P, as illustrated in FIG. 2, such that the blades 18 each enclose an acute angle β with the external surface S of the pipe P rearwardly of the point of insertion of the blade 18 in relation to the distal end of the pipe P.

In this embodiment the insertion angle β is 65 degrees.

In one embodiment the insertion angle β is at least about 50 degrees.

In one embodiment the insertion angle β is at least about 55 degrees.

In one embodiment the insertion angle β is not greater than about 80 degrees.

Figure 7:
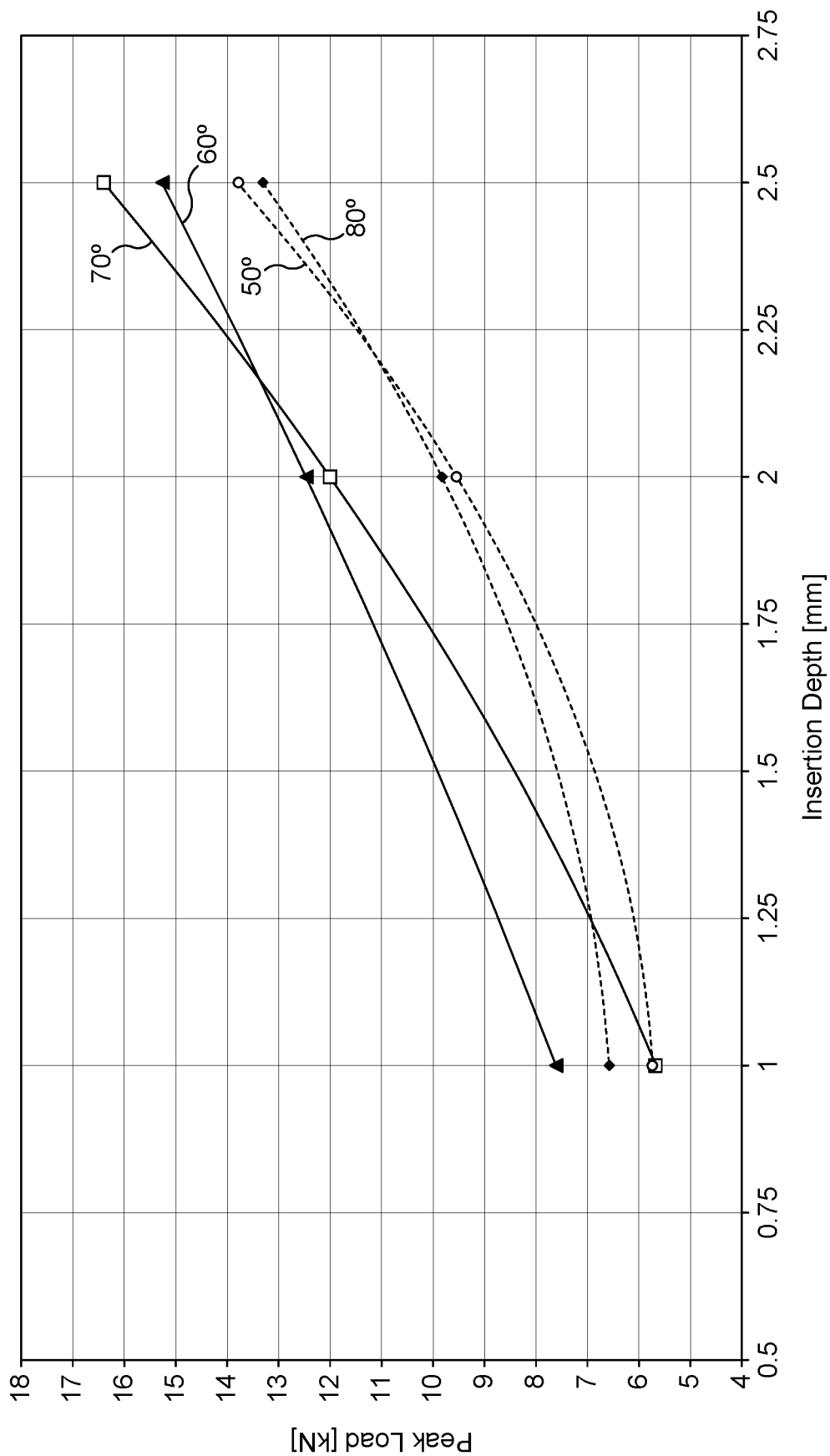
FIG. 7 illustrates plots of the maximum axial load sustainable by pipe couplings having different insertion angles as a function of insertion depth.
Figure 8:
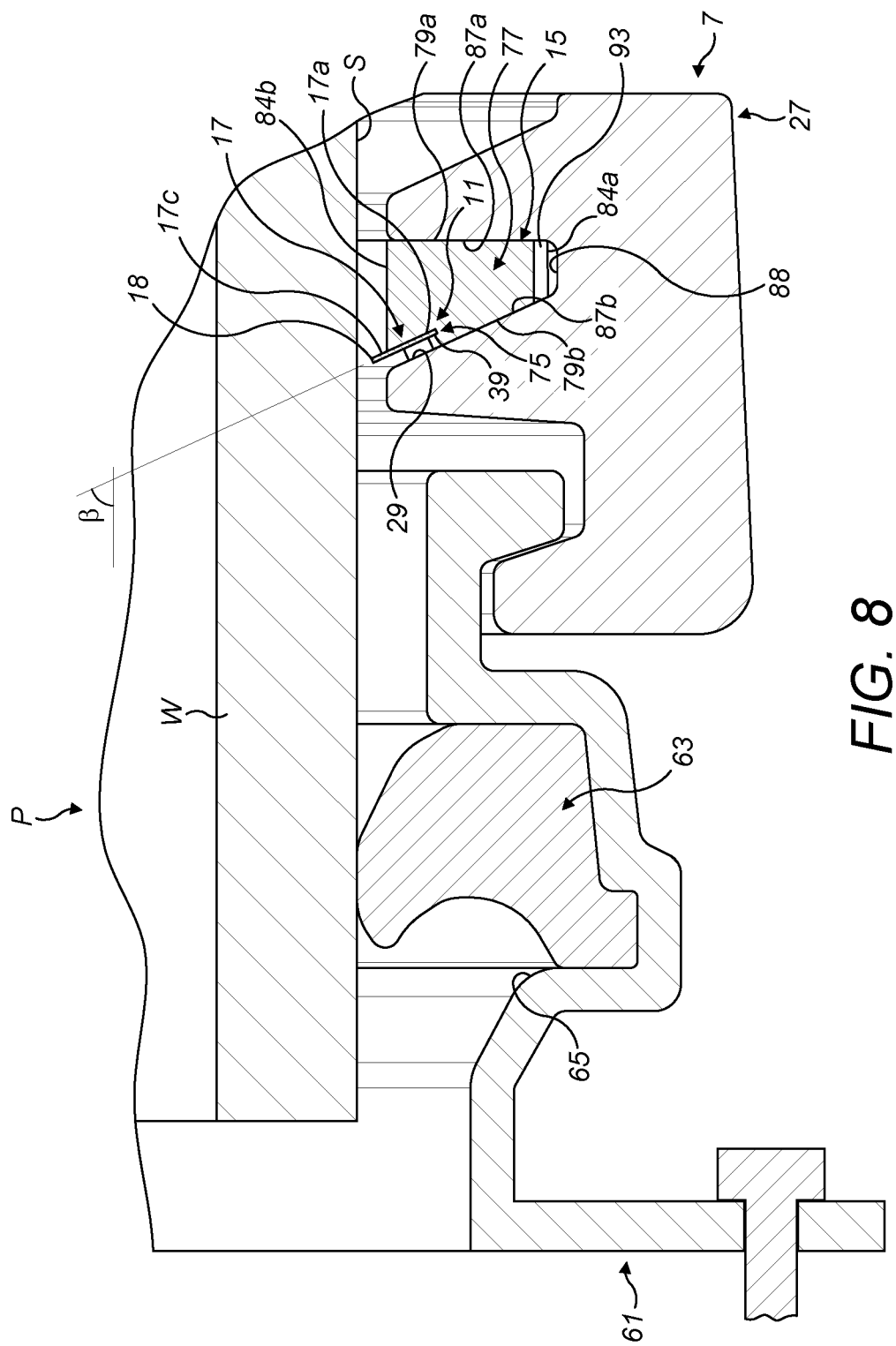
FIG. 8 illustrates a longitudinal sectional view of a pipe coupling in accordance with a second embodiment of the present invention when located over the pipe end and before application of any radial, compressive loading of the pipe coupling.
Figure 9:
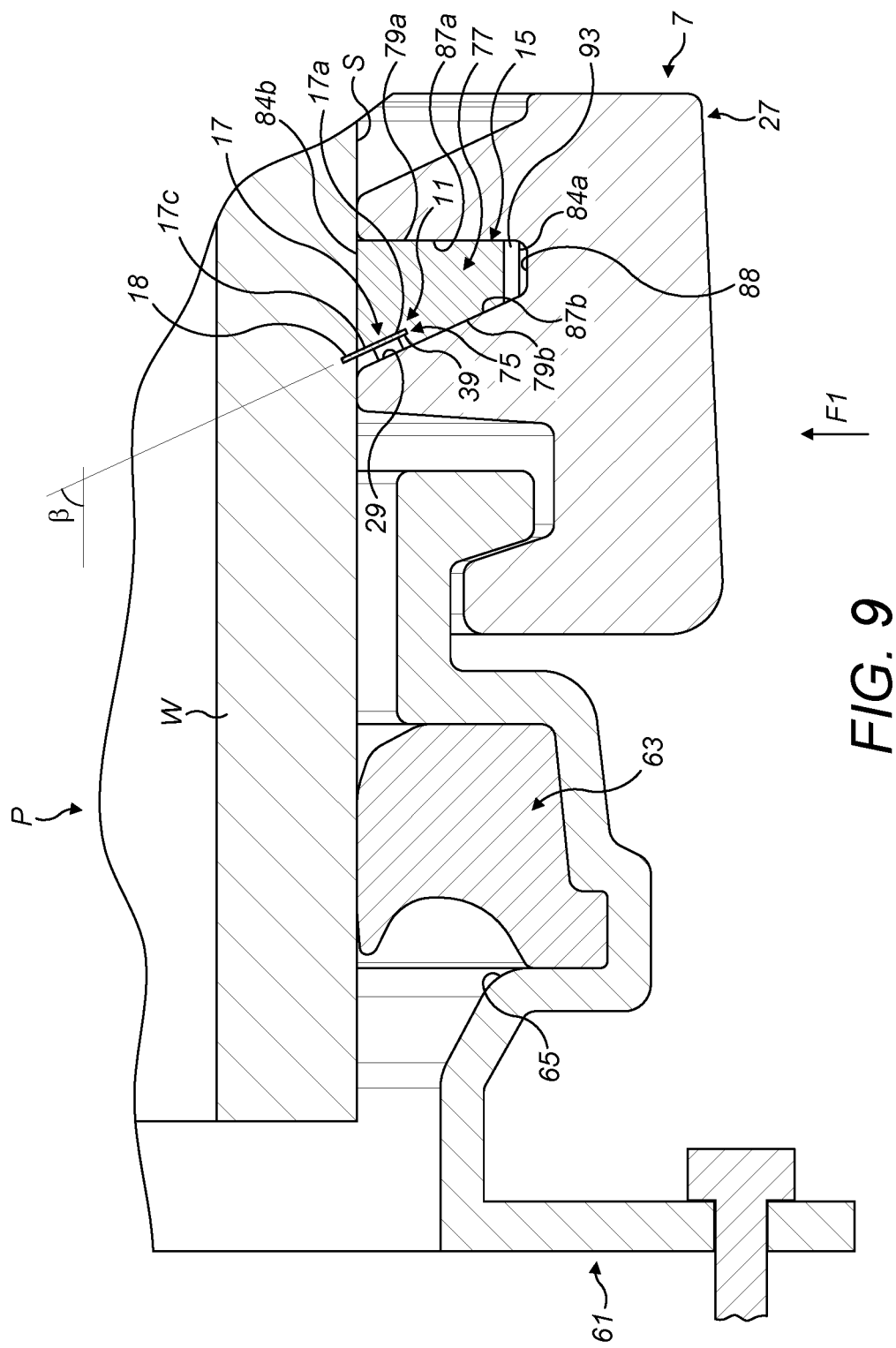
FIG. 9 illustrates a longitudinal sectional view of the pipe coupling of FIG. 8 when subjected to a predetermined compressive loading for a fluid-tight seal.
Figure 10:
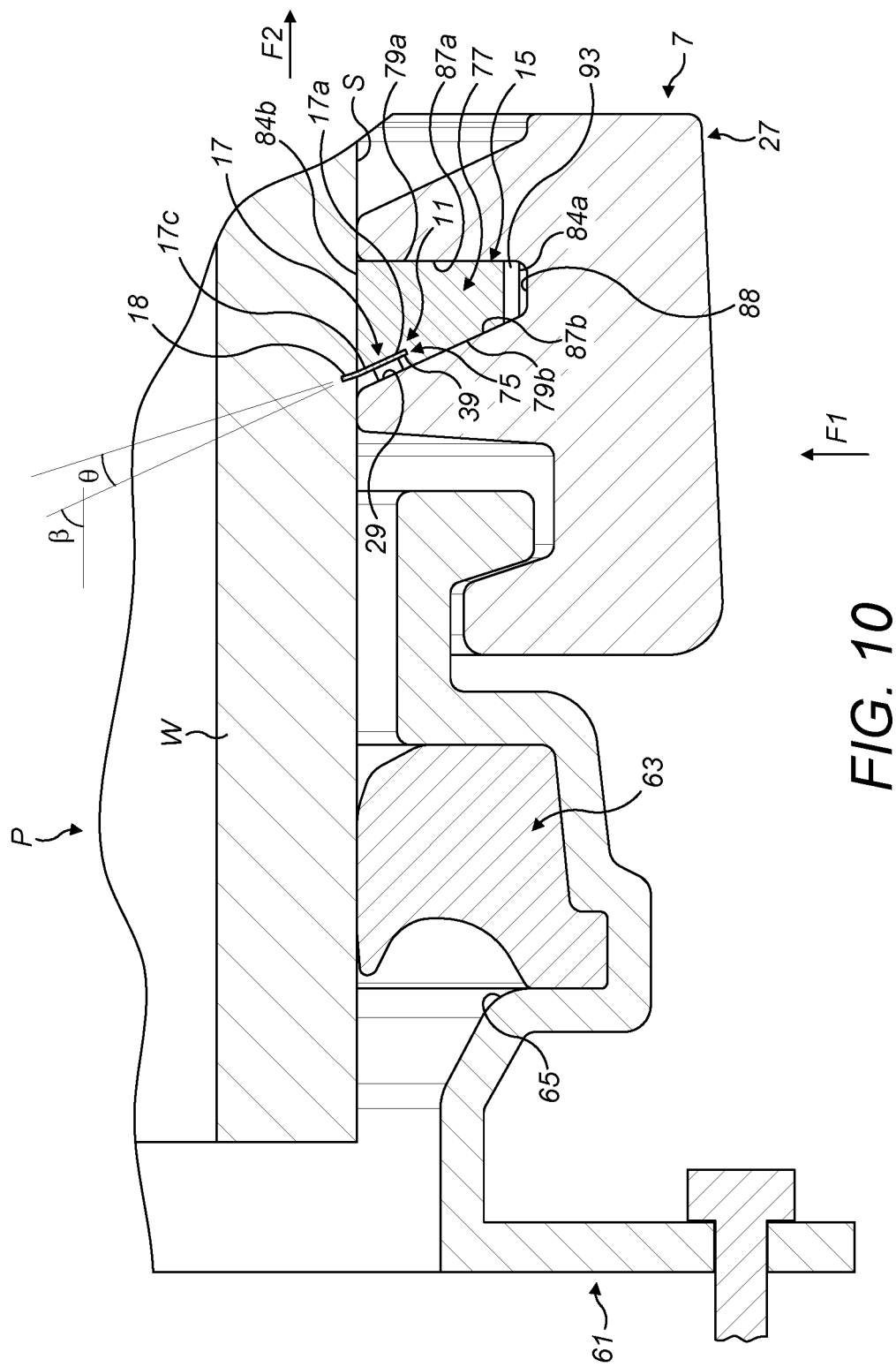
FIG. 10 illustrates a longitudinal sectional view of the pipe coupling of FIG. 8 following application of an axial loading of the pipe relative to the pipe coupling.
Figure 11A:
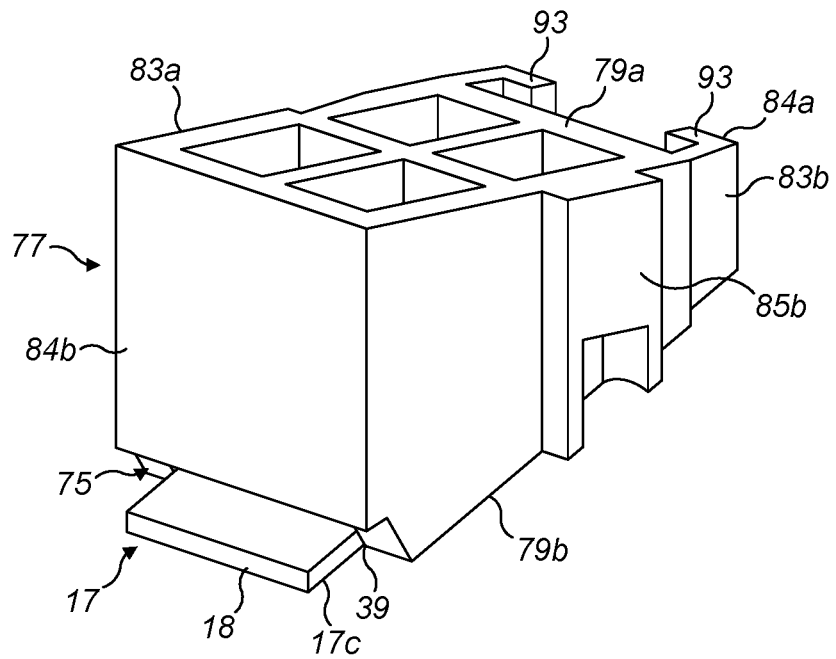
FIGS. 11(a) to (c) illustrate views of a carrier member and blade element of the pipe coupling of FIG. 8.
Figure 11B:
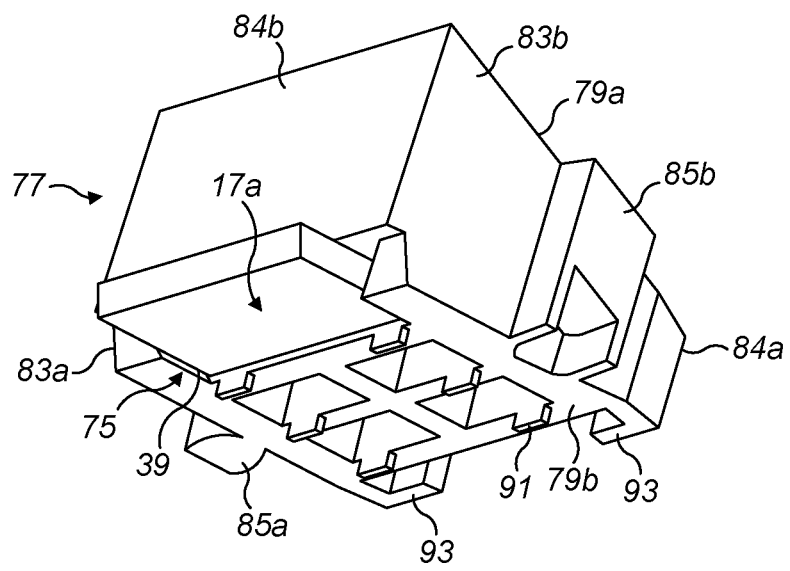
Figure 11C:
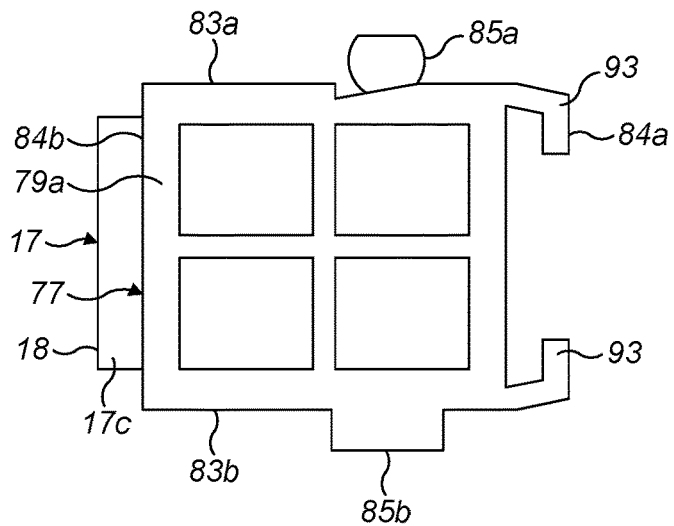
Figure 12:
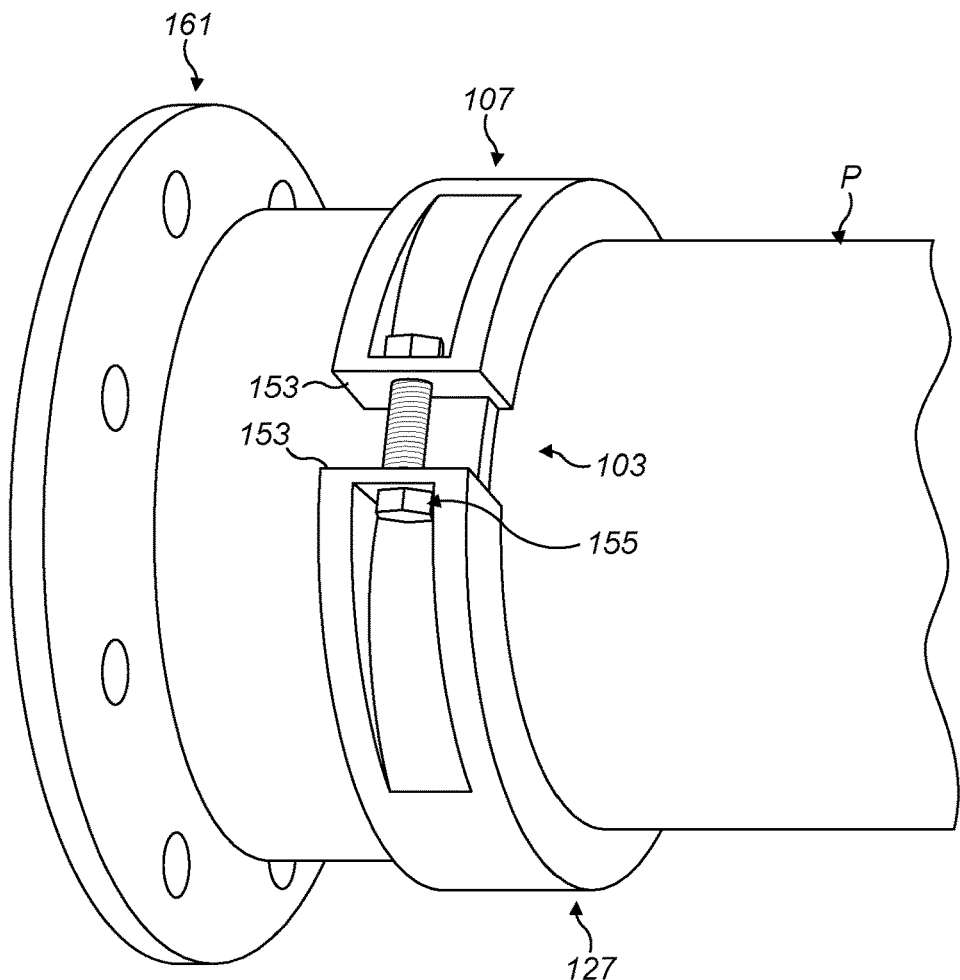
FIG. 12 illustrates a perspective view of a pipe coupling in accordance with a third embodiment of the present invention where fitted to a pipe end.

FIG. 7 shows the relationship of the maximum axial load which can be withstood by the pipe coupling, where the blade elements 17 are arranged in symmetrical relation, with insertion angles β of 50, 60, 70 and 80 degrees. As will be seen, for axial loads greater than about 10 kN, configuring the blades 18 to have an insertion angle β of between 60 and 70 degrees, optimally about 65 degrees, provides for substantially greater resistance to axial loads for any given insertion depth.

Figure 3:
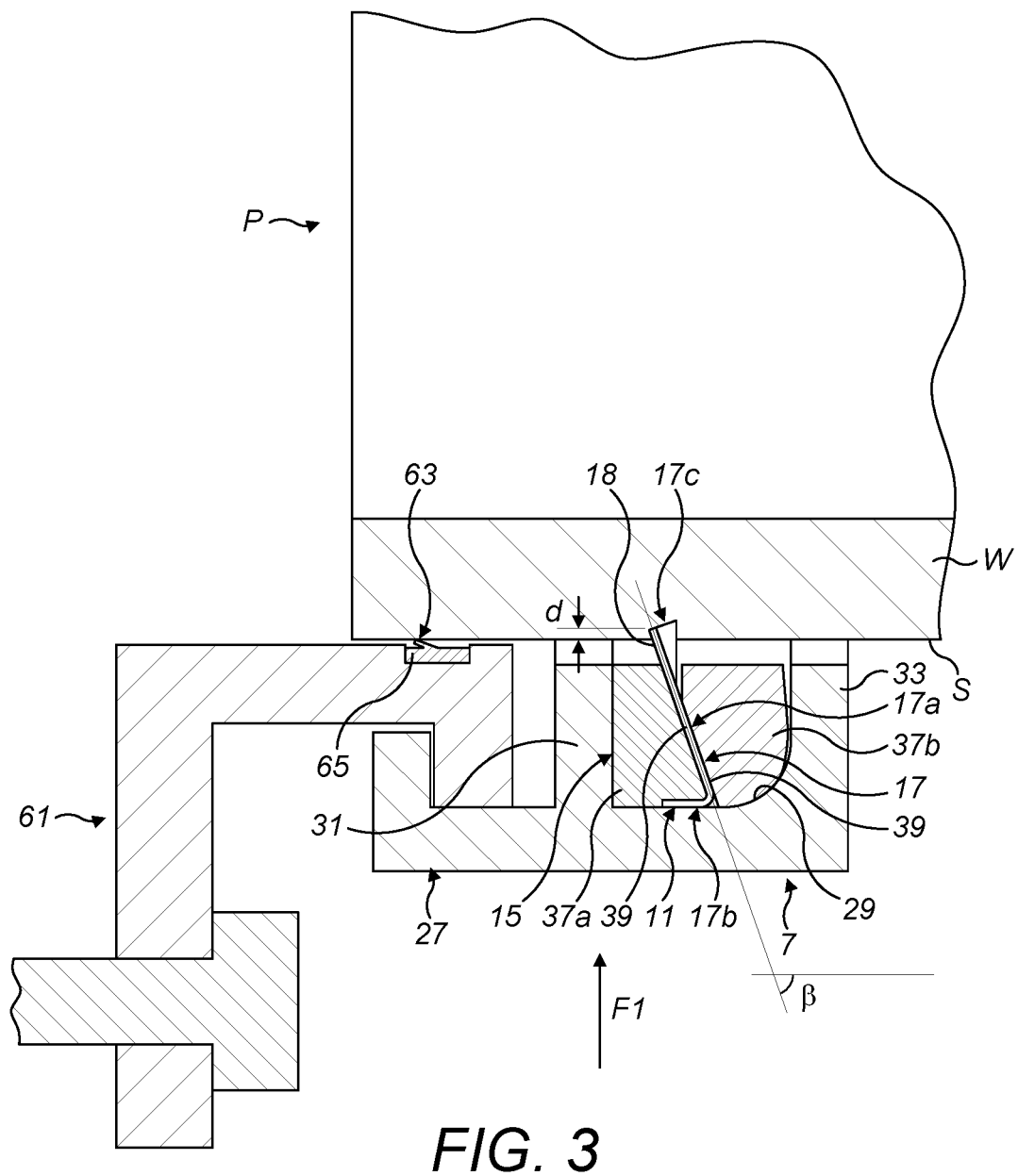
FIG. 3 illustrates a longitudinal sectional view of the pipe coupling of FIG. 1 when fitted to the pipe end and subjected to a predetermined compressive loading for a fluid-tight seal.

In this embodiment the blade elements 17 are inserted a predetermined depth d into the wall W of the pipe P, as illustrated in FIG. 3, with the insertion depth d being less than 10% of the thickness of the wall W of the pipe P. By way of example, for a 630 mm SDR17 pipe, the blade elements 17 could be inserted 15 mm into the wall W of the pipe P.

In this embodiment the blades 18 each comprise first and second spaced blade sections 18a, b, which allow the blade 18 to conform the outer peripheral surface S of the pipe P when displaced inwardly by operation of the clamp 7.

In this embodiment the blade sections 18a, b are coupled by a web section 19, here of V shape, which supports the blade sections 18a, b in the axial direction and enables relative movement of the blade sections 18a, b in the radial direction, such as to promote preferential movement in relation to the web section 19 during compression of the gripper 11 and thereby promote uniform displacement of the blade elements 17.

In this embodiment the blades 18 together define an inner opening 21 which has a diameter greater than the outer diameter of the pipe P, as illustrated in FIG. 2, thereby facilitating fitting of the pipe coupling to the pipe P, especially when the pipe P is out of round.

In this embodiment the diameter of the inner opening 21 is such as to allow for the pipe P being 3% out of round from the nominal outer diameter, optionally being 5% out of round.

In one embodiment the blades 18 form a substantially-continuous annular ring.

In another embodiment the blades 18 are located at spaced locations about the gripper ring 3, with the arrangement and spacing therebetween being determined by the operational loading of the pipe P. In one embodiment the blades 18 have a space therebetween of at least half the width of the blades 18, optionally at least the width of the blades 18, and optionally at least twice the width of the blades 18.

In this embodiment the blade elements 17 are formed of sheet material, here a spring stainless steel.

In an alternative embodiment the blade elements 17 could be formed of a coated mild steel.

In one embodiment at least the inner edge sections 17c of the blade elements 17 are formed of sheet material.

In this embodiment the gripper 11 is formed from a single sheet, here by a stamping operation, but could alternatively be formed by other cutting and bending operations, with adjacent ones of the blade elements 17 being interconnected by web elements 23, here in the form of strips.

In this embodiment the web elements 23 comprise sections 23a, b which are inclined in relation to the radial direction, such as to promote preferential bending of the web elements 23 during compression of the gripper 11 and thereby promote uniform displacement of the blade elements 17.

In an alternative embodiment the blade elements 17 could be formed as separate elements which are not interconnected.

Figure 6:
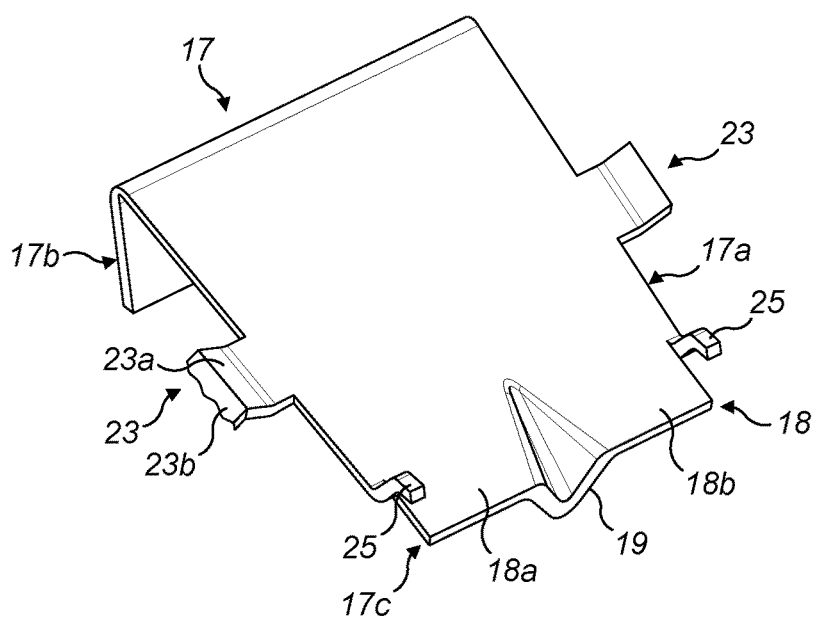
FIG. 6 illustrates an enlarged perspective view of one gripper element of the gripper ring of FIG. 5.

In this embodiment, as particularly illustrated in FIG. 6, the blade elements 17 comprise at least one, here first and second guides 25, which are arranged in relation to the edge of the blade 18, such that, on insertion of the blade element 17 to the required extent into the wall W of the pipe P, the guides 25 abut the external surface S of the pipe P, thereby providing a clear visual indication to the operator when the clamp 7 is applied to the required extent.

In this embodiment the clamp 7 comprises an annular body 27 which includes a recess 29 which captively receives the gripper ring 3, in this embodiment being defined by first and second flange members 31, 33 which are spaced in axial relation.

In this embodiment the carrier 15 comprises at least one, here first and second support members 37a, b, which act to sandwich the gripper 11 therebetween.

In this embodiment the support members 37a, b each have a support surface 39, and the support surfaces 39 receive the main bodies 17a of the blade elements 17 therebetween, such as to orient the blade elements 17 at the predetermined insertion angle β.

As discussed above, the pipe coupling of the present invention operates by displacement of the blade elements 17 by application of a radial load F1, such that the blade elements 17 are inserted into the wall W of the pipe P to a predetermined extent, which does not require the maintenance of a high crush loading on the pipe P.

Figure 4:
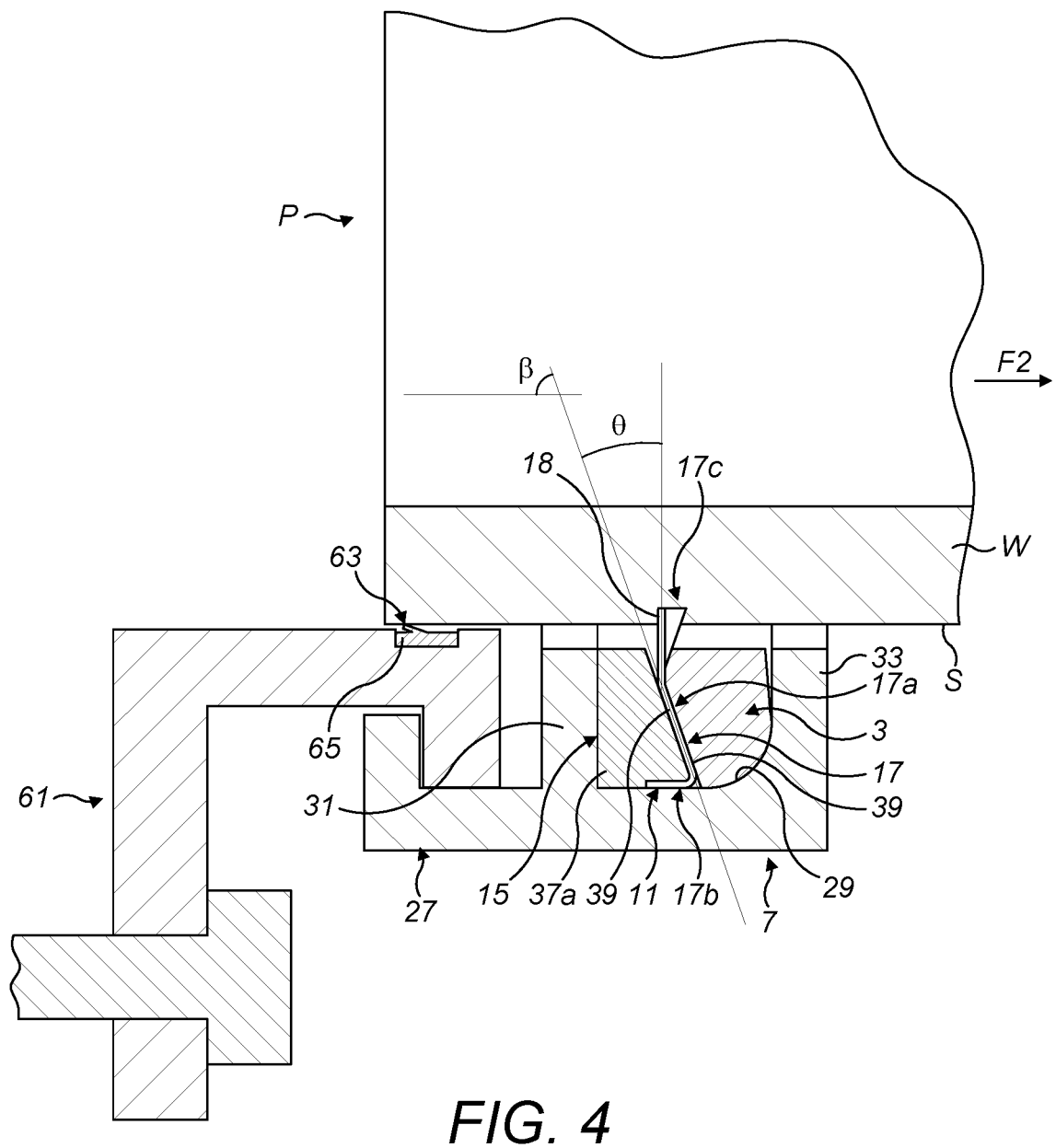
FIG. 4 illustrates a longitudinal sectional view of the pipe coupling of FIG. 1 following application of an axial loading of the pipe relative to the pipe coupling.
Figure 5:
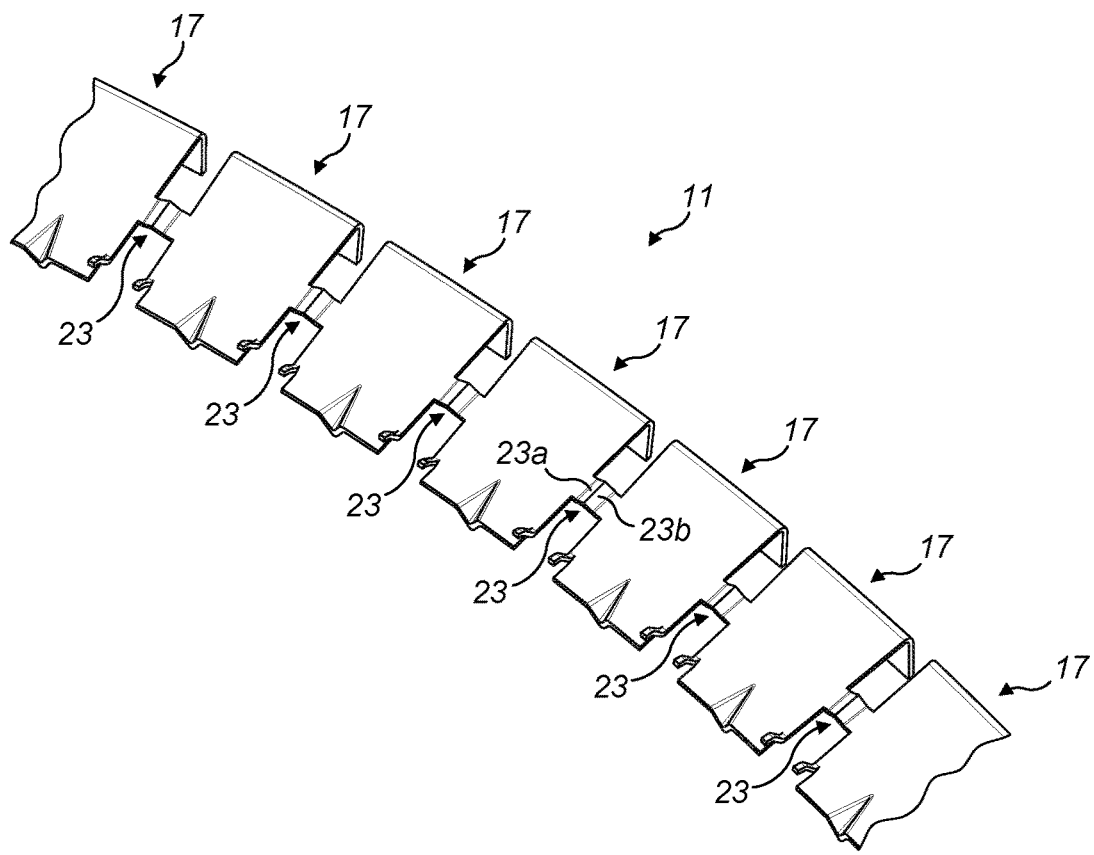
FIG. 5 illustrates a fragmentary perspective view of the gripper of the gripper ring of the pipe coupling of FIG. 1.

In use, the pipe P will be subjected to an axial load F2, which the pipe coupling is configured to withstand. With an increasing axial load F2 below the rated load for the pipe coupling, the blades 18 of the blade elements 17 are configured to pivot and elastically deform, as illustrated in FIG. 4 where the blade 18 pivots through an angle θ in relation to the insertion angle β, allowing the pipe coupling to withstand a significant axial load F2, and to return to the original configuration on release of the axial load F2.

In this embodiment the clamp 7 comprises a ring clamp and the clamp body 27 has open ends 53, with a fixing 55, here a bolt arrangement, connecting the open ends 53 and being operative to provide for closure of the annular body 27 and thus clamping of the gripper ring 3.

In an alternative embodiment the clamp 7 could be a multi-segment clamp comprising a plurality of clamp body parts 27 with adjacent open ends 53, and a plurality of fixings 55 which interconnect the same.

The pipe coupling further comprises a coupling member 61 which is connected to the clamp 7 and provides for connection to a pipe component.

In this embodiment the coupling member 61 comprises a flange adaptor, but could be any kind of pipe component.

The pipe coupling further comprises an annular seal 63 which maintains a fluid-tight seal with the external surface of the pipe P. In this embodiment the coupling member 61 includes an annular recess 65, which receives the seal 63.

In this embodiment the seal 63 is a lip seal, which utilizes the fluid pressure to maintain the seal, with an increasing sealing force being applied with increasing fluid pressure. As noted above, existing pipe couplings necessitate the use of a compression seal, which relies on the compression force to achieve sealing, and does not provide for an increasing sealing force with increasing fluid pressure.

FIGS. 8 to 11 illustrate a pipe coupling in accordance with a second embodiment of the present invention.

The pipe coupling of this embodiment is similar to the pipe coupling of the first-described embodiment, and thus, in order to avoid unnecessary duplication of description, only the differences will be described in detail, with like parts being designated by like reference signs.

In this embodiment the blade elements 17 are separate elements, and omit the formed external edge section 17b.

In this embodiment the carrier 15 comprises a plurality of recesses 75, which each provide the support surfaces 39, which support the main body sections 17a of the respective blade elements 17.

In this embodiment the carrier 15 comprises a plurality of carrier members 77 which are disposed in the recess 29 in the annular body 27 of the clamp 7.

In this embodiment the carrier members 77 each having oppositely-directed, axial faces 79a, b which engage the recess 29 in the annular body 27 of the clamp 7, oppositely-directed circumferential faces 83a, b, and oppositely-directed, inner and outer radial faces 84a, b.

In this embodiment the carrier members 77 are interconnected, here interengaged, as an annulus which extends around the external surface S of the wall W of the pipe P.

In this embodiment the carrier members 77 each have first and second engagement elements 85a, b, here male and female elements, by which adjacent ones of the carrier members 77 are interengaged.

In this embodiment the engagement elements 85a, b are disposed to the circumferential faces 83a, b of the carrier member 77.

In this embodiment the recess 29 in the annular body 27 of the clamp 7 has first and second opposed, axial faces 87a, b and an inner radial face 88, and the axial faces 87a, b of the annular body 27 of the clamp 7 and the axial faces 79a, b of the carrier members 77 are of corresponding tapered or wedge shape, maintaining the carrier members 77 in a fixed orientation in relation to the pipe P during the application of a radial load F1 to the clamp 7.

In this embodiment the recess 29 in the annular body 27 of the clamp 7 and the carrier members 77 are configured to allow for limited radial displacement of the carrier members 77 in relation to clamp 7 during the application of a radial load F1 to the clamp 7, as will be described further hereinbelow.

In this embodiment one, first faces 79a, 87a of the recess 29 and the carrier members 77 extend in a plane which is substantially perpendicular to the external surface S of the pipe P, and the other, second faces 79b, 87b of the recess 29 and the carrier members 77 are inclined outwardly in relation to the one, first faces 79a, 87a of the recess 29 and the carrier members 77.

In this embodiment at least one of the axial faces 79a, b of the carrier members 77 includes at least one, here a plurality of first deformable elements 91, which are configured to maintain the relative orientation of the carrier members 77 but are deformable on application of a radial load F1 to the clamp 7, so as to enable the carrier members 77 to be displaced, to a limited extent, further into the recess 29 in the annular body 27 of the clamp 7.

In this embodiment the first deformable elements 91 comprise an array of projections.

In this embodiment the carrier members 77 each further include at least one, here a plurality of second deformable elements 93, which engage the inner radial face 88 of the recess 29 in the annular body 27 of the clamp 7 and, with the application of increasing radial load F1 during tightening of the clamp 7, can be deformed.

This configuration allows the pipe coupling to accommodate the pipe P when out-of-round or having some ovality, in that the second deformable elements 93 of ones of the carrier members 77 which first engage the external surface S of the pipe P can be displaced outwardly in relation to the clamp 7 while the clamp 7 is continued to be tightened, until the clamp 7 is tightened sufficiently that the inner radial faces 84b of the carrier members 77 abut the external surface S of the wall of the pipe P.

FIGS. 12 to 15 illustrate a pipe coupling or connector in accordance with a third embodiment of the present invention.

The pipe coupling comprises at least one annular gripper ring 103 which receives a pipe P therewithin, and a clamp 107 which acts to apply a radially-inward compressive load on the gripper ring 103 in order to displace the gripper ring 103 against an external peripheral surface S of a wall W of the pipe P, as will be described in more detail hereinbelow.

In this embodiment the gripper ring 103 comprises a gripper 111 which is inserted into the external surface S of the pipe P when the gripper ring 103 is clamped to the pipe P by operation of the clamp 107, and a carrier 115 which supports the gripper 111 with a defined orient in relation to the external surface S of the pipe P.

In this embodiment the gripper 111 comprises a plurality of blade elements 117, which, when clamped to the pipe P by the clamp 7, are inserted into the external surface S of the pipe P, here cutting into the external surface S of the pipe P.

In this embodiment the blade elements 117 are each substantially annular and are arranged in spaced axial relation, such as to engage the external surface S of the pipe P at spaced locations along a length thereof.

Figure 15A:
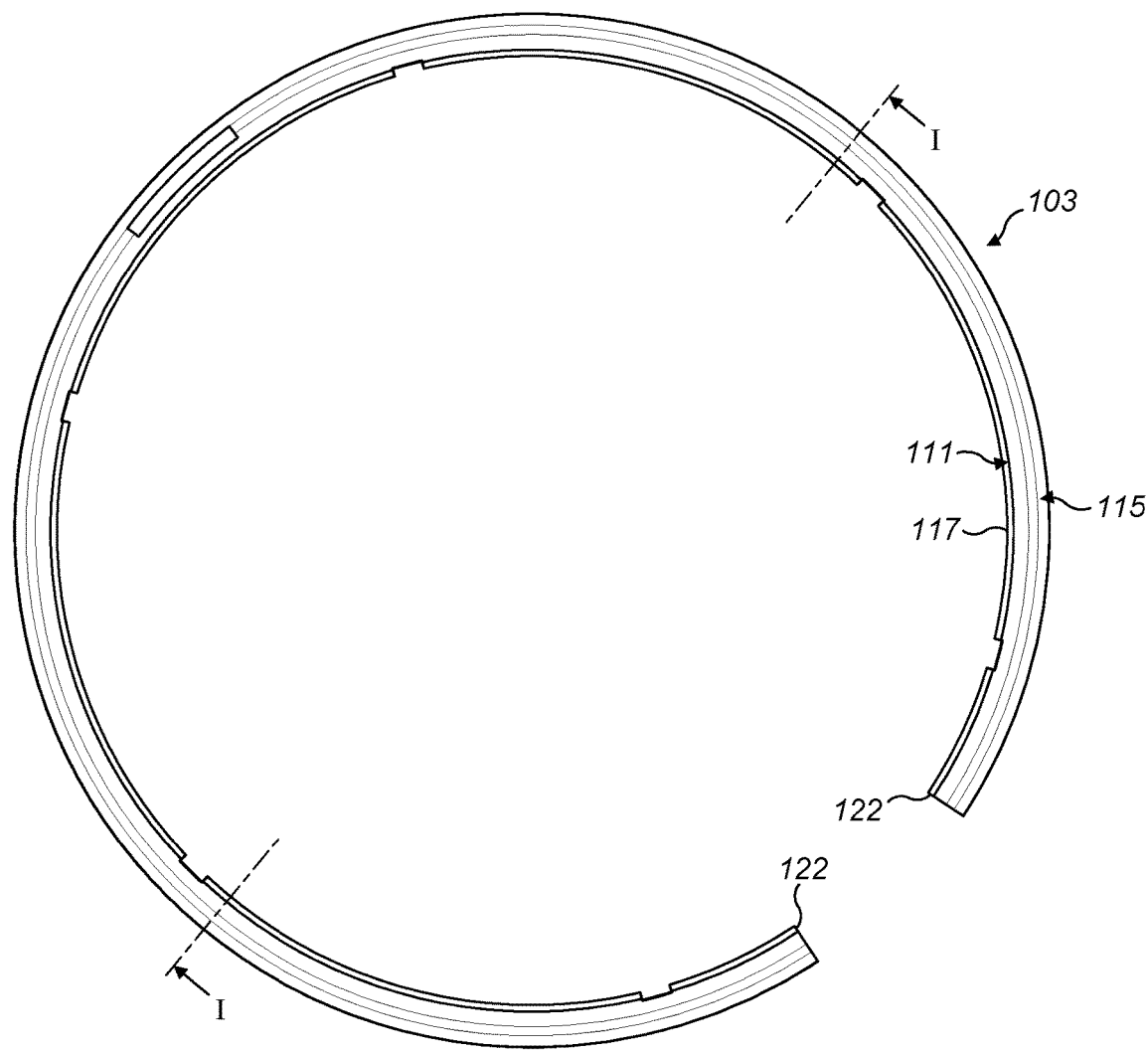
FIG. 15(a) illustrates a plan view of the gripper ring of the pipe coupling of FIG. 12.
Figure 15B:
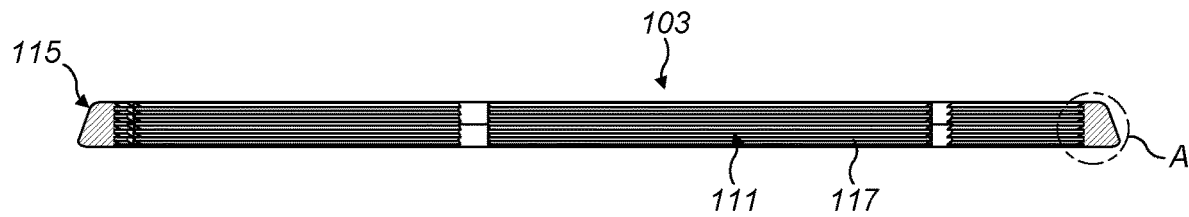
FIG. 15(b) illustrates a sectional view (along section I-I in FIG. 15(a)) of the gripper ring of the pipe coupling of FIG. 12.
Figure 15C:
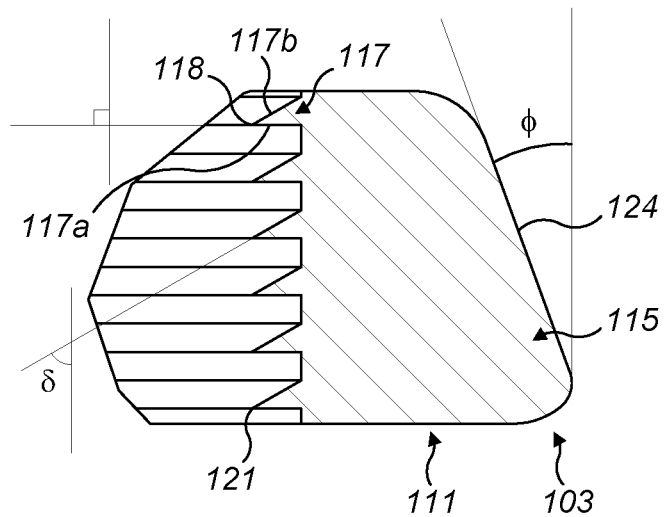
FIG. 15(c) illustrates an enlarged view of detail A in FIG. 15(b)

In this embodiment, as particularly illustrated in FIG. 15(c), the blade elements 117 each have a first, engagement face 117a, which engages the wall W of the pipe P to prevent the pipe P being withdrawn from the pipe coupling, and a cutting face 117b which is inclined in relation to the engagement face 117a, with the junction of the engagement and cutting faces 117a, b providing a blade 118 which is inserted into the external surface S of the pipe P, here cutting into the external surface S of the pipe P, in order to engage the pipe P.

In this embodiment the engagement face 117a extends substantially orthogonally to the longitudinal axis of the pipe coupling, optionally within 10 degrees of a plane orthogonal to the longitudinal axis of the pipe P, and optionally within 5 degrees of a plane orthogonal to the longitudinal axis of the pipe P.

In this embodiment the cutting face 117b encloses an angle δ of 60 degrees with the longitudinal axis of the pipe coupling.

In one embodiment the cutting face 117b encloses an angle δ of greater than about 45 degrees with the longitudinal axis of the pipe coupling, optionally greater than about 55 degrees, optionally less than about 75 degrees with the longitudinal axis of the pipe P, optionally less than about 65 degrees with the longitudinal axis of the pipe P.

Figure 14:
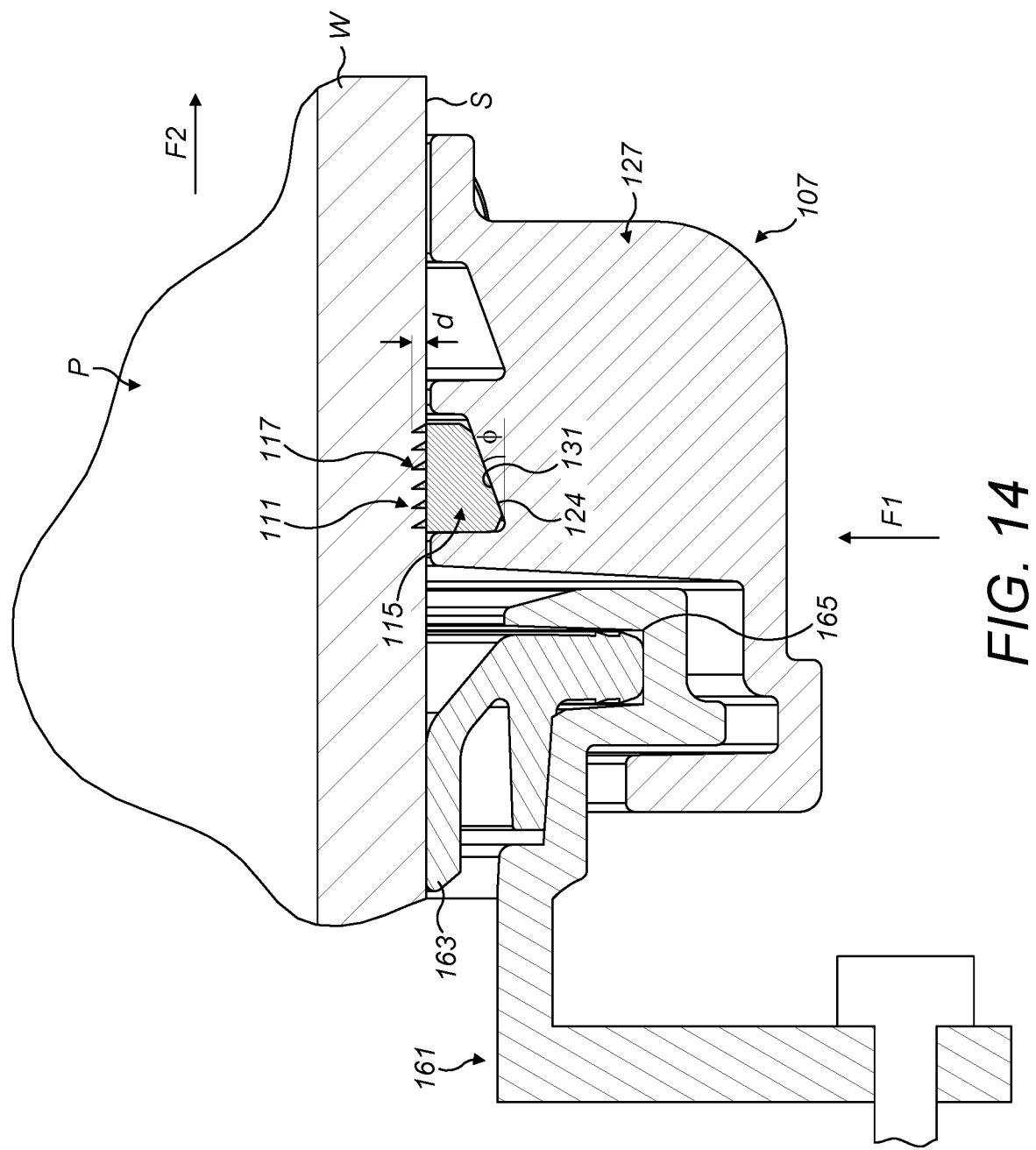
FIG. 14 illustrates a longitudinal sectional view of the pipe coupling of FIG. 12 when fitted to the pipe end and subjected to a predetermined compressive loading for a fluid-tight seal and subjected to an axial loading of the pipe relative to the pipe coupling.

In this embodiment the blade elements 117 have a predetermined length, such as to be inserted a predetermined depth d into the wall W of the pipe P, as illustrated in FIG. 14, with the insertion depth d being less than 10% of the thickness of the wall W of the pipe P. By way of example, for a 630 mm SDR17 pipe, the blade elements 117 could be inserted 3.5 mm into the wall W of the pipe P.

In this embodiment the blade elements 117 have a length of 3.25 mm.

In one embodiment the blade elements 117 have a length of at least about 2 mm, optionally at least about 3 mm.

Figure 13:
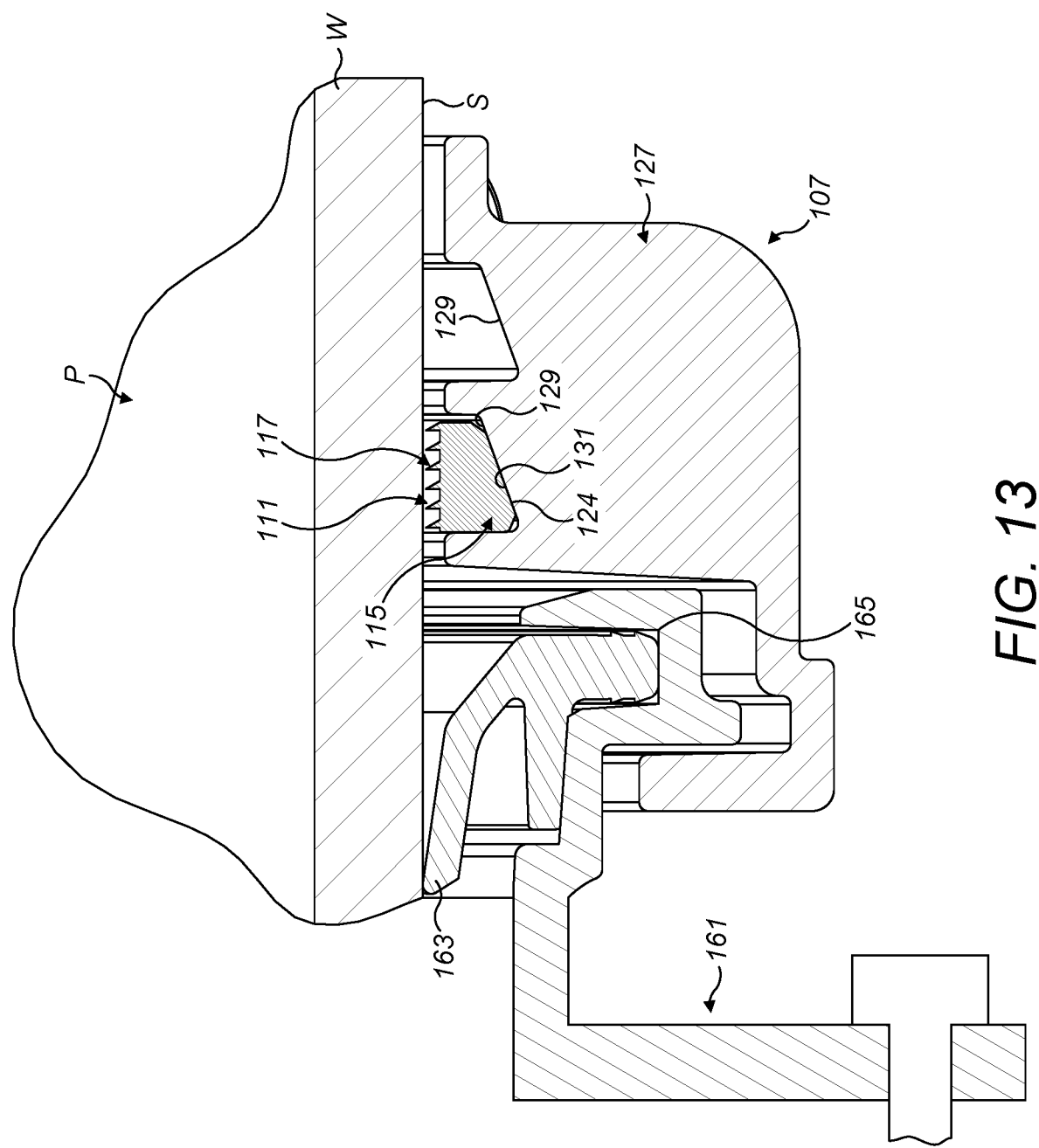
FIG. 13 illustrates a longitudinal sectional view of the pipe coupling of FIG. 12 when located over the pipe end and before application of any radial, compressive loading of the pipe coupling.

In this embodiment the blades 118 define an inner opening 121 which has a diameter greater than the outer diameter of the pipe P, as illustrated in FIG. 13, thereby facilitating fitting of the pipe coupling to the pipe P, especially when the pipe P is out of round.

In this embodiment the diameter of the inner opening 121 is such as to allow for the pipe P being 3% out of round from the nominal outer diameter, optionally being 5% out of round.

In this embodiment the gripper 111 has free distal ends 120, which allow for the inner opening 121 of the blades 118 to be reduced on clamping.

In this embodiment the distal ends 122 of the gripper 111 are interconnected by a deformable web 123.

In this embodiment the web 123 comprises a rib.

In this embodiment the gripper 111 is formed of stainless steel.

In an alternative embodiment the gripper 111 could be formed of a coated mild steel.

In this embodiment the carrier 115 has an outer, support surface 124 which is inclined or tapered in relation to the longitudinal axis of the pipe coupling, and, as will be described in more detail hereinbelow, engages a counterpart support surface 131 on the clamp 107.

In this embodiment the carrier 115 is formed of stainless steel.

In an alternative embodiment the carrier 115 could be formed of a coated mild steel.

In this embodiment the gripper 111 and the carrier 115 of the gripper ring 103 are integrally formed as a single part. In one embodiment the gripper ring 103 is a cast structure.

In this embodiment the clamp 107 comprises an annular body 127 which includes at least one recess 129 which captively receives the at least one gripper ring 103.

In this embodiment the at least one recess 129 includes an annular, inwardly-facing support surface 131, which supports the support surface 123 of the respective gripper ring 103.

In this embodiment the support surface 131 of the clamp 107 is inclined or tapered to the longitudinal axis of the pipe coupling, tapering radially inwardly in a direction away from the distal end of the pipe P.

In this embodiment the support surface 124 of the carrier 115 and the support surface 131 of the clamp 107 enclose an angle ø of 20 degrees in relation to the longitudinal axis of the pipe coupling.

In this embodiment the support surface 124 of the carrier 115 and the support surface 131 of the clamp 107 enclose an angle ø of greater than 0 degrees and less than 45 degrees in relation to the longitudinal axis of the pipe coupling, optionally greater than about 5 degrees, optionally less than about 30 degrees.

As discussed above, the pipe coupling of the present invention operates by displacement of the blade elements 117 by application of a radial load F1, such that the blades elements 117 are inserted into the wall W of the pipe P to a predetermined extent, which does not require the maintenance of a high crush loading on the pipe P.

In use, the pipe P will be subjected to an axial load F2, which the pipe coupling is configured to withstand. With an increasing axial load F2 below the rated load for the pipe coupling, the blade elements 117 of the gripper ring 103 are subjected to an increased radial load F1 by operation of the gripper ring 103, and the support surface 124 of the carrier 115 thereof, moving along the tapered support surface 131 of the clamp 107, which movement biases the gripper ring 103 radially inwardly into tighter engagement with the external surface S of the pipe P, allowing the pipe coupling to withstand a significant axial load F2, and to return to the original configuration on release of the axial load F2.

In this embodiment the clamp 107 includes a plurality of recesses 129 which receive respective ones of a plurality of gripper rings 103. With this configuration, the pipe coupling can be readily re-configured to accommodate a differing axial load F2, depending upon application.

In this embodiment the clamp 107 comprises a ring clamp and the clamp body 127 has open ends 153, with a fixing 155, here a bolt arrangement, connecting the open ends 153 and being operative to provide for closure of the annular body 127 and thus clamping of the gripper ring 103.

In an alternative embodiment the clamp 107 could be a multi-segment clamp comprising a plurality of clamp body parts 127 with adjacent open ends 153, and a plurality of fixings 155 which interconnect the same.

The pipe coupling further comprises a coupling member 161 which is connected to the clamp 107 and provides for connection to a pipe component.

In this embodiment the coupling member 161 comprises a flange adaptor, but could be any kind of pipe component.

The pipe coupling further comprises an annular seal 163 which maintains a fluid-tight seal with the external surface of the pipe P. In this embodiment the coupling member 161 includes an annular recess 165, which receives the seal 163.

In this embodiment the seal 163 is a lip seal, which utilizes the fluid pressure to maintain the seal, with an increasing sealing force being applied with increasing fluid pressure. As noted above, existing pipe couplings necessitate the use of a compression seal, which relies on the compression force to achieve sealing, and does not provide for an increasing sealing force with increasing fluid pressure.

Finally, it will be understood that the present invention has been described in its preferred embodiments and can be modified in many different ways without departing from the scope of the invention as defined by the appended claims.

Figure 16:
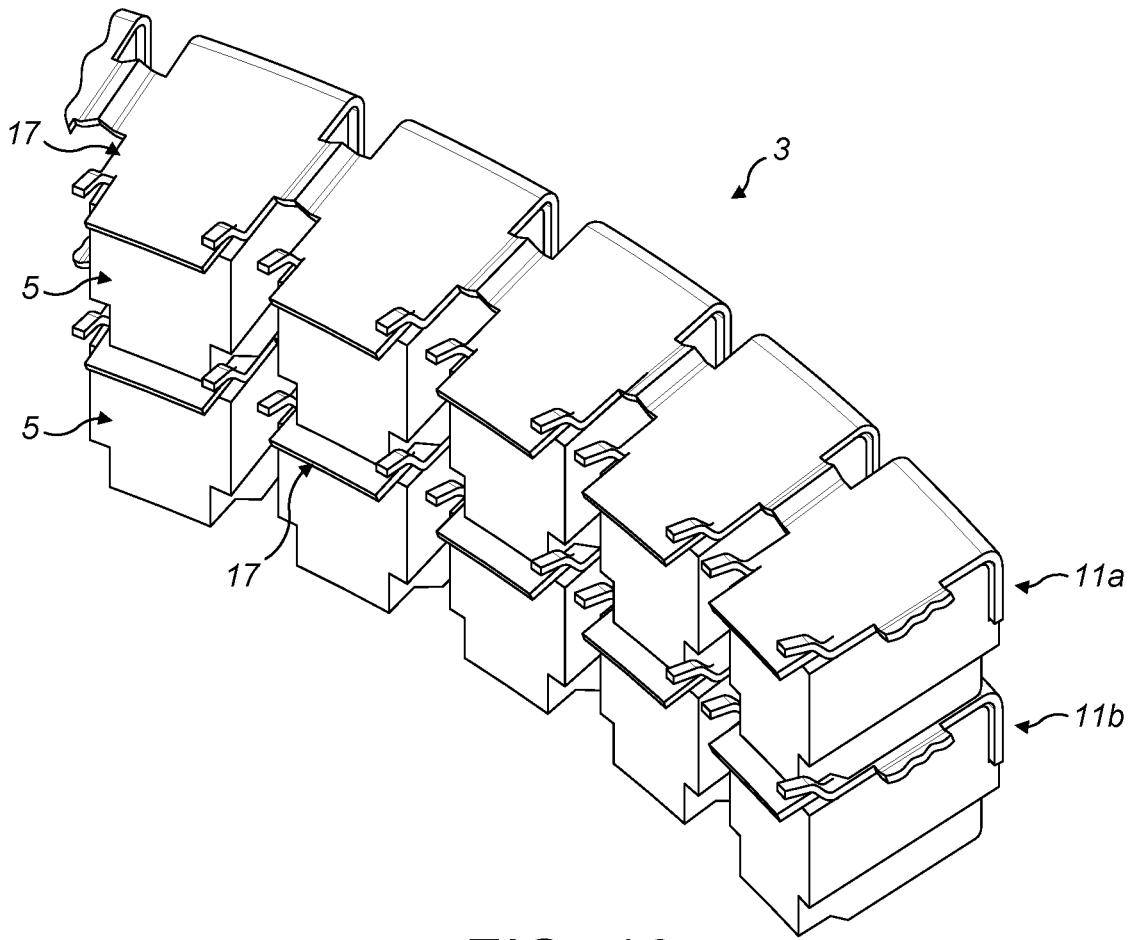
FIG. 16 illustrates a gripper ring as a modification of the pipe coupling of FIG. 1.

In one modification, as illustrated in FIG. 16, the pipe coupling could comprise a plurality of grippers 11a, b which are arranged in spaced axial relation, here stacked relation, such as to provide for increased resistance to axial loading.

The present invention also extends to the invention as defined in the following numbered paragraphs.

1. A pipe connector or coupling for providing a coupling to a pipe, the pipe coupling comprising;

at least one gripper ring which receives a pipe therewithin, wherein the at least one gripper ring comprises a gripper which includes a plurality of blade elements which are displaceable between a first, pipe-receiving configuration in which the pipe is receivable within the at least one gripper ring and a second, inwardly-displaced inserted configuration in which the blade elements are inserted into an external wall of the pipe; and a clamp for applying a radially-inward compressive load on the at least one gripper ring to displace the blade elements thereof from the pipe-receiving configuration to the inserted configuration.

2. The pipe coupling of paragraph 1, wherein the at least one gripper ring comprises a carrier which supports the gripper with a defined orientation.

3. The pipe coupling of paragraph 1 or 2, wherein the blade elements are inserted into the wall of the pipe by cutting into the wall of the pipe.

4. The pipe coupling of any of paragraphs 1 to 3, wherein the blade elements each have a main body section by which the blade element is supported, and an internal blade edge section which includes at least one blade edge which is inserted into the external wall of the pipe.

5. The pipe coupling of paragraph 4, wherein the blade elements each have an external edge section by which the blade element is displaced inwardly during operation of the clamp, optionally the external edge section is engaged by the clamp.

6. The pipe coupling of paragraph 4 or 5, wherein the blade edge section has a predetermined angle in relation to the longitudinal axis of the pipe coupling, such that the blade edge sections are inserted into the external wall of the pipe at a predetermined angle thereto.

7. The pipe coupling of paragraph 6, wherein the blade edge sections enclose an acute angle ($\beta$) with the longitudinal axis of the pipe coupling rearwardly of the blade edges in relation to the distal end of the pipe.

8. The pipe coupling of paragraph 7, wherein the angle ($\beta$) is at least about 50 degrees.

9. The pipe coupling of paragraph 7, wherein the angle ($\beta$) is at least about 55 degrees.

10. The pipe coupling of any of paragraphs 7 to 9, wherein the angle ($\beta$) is not greater than about 80 degrees.

11. The pipe coupling of paragraph 7, wherein the angle ($\beta$) is between about 60 degrees and about 70 degrees.

12. The pipe coupling of any of paragraphs 4 to 11, wherein the blade edge sections each comprise first and second spaced blade edges.

13. The pipe coupling of paragraph 12, wherein the first and second blade edges are coupled by a web, optionally of V shape.

14. The pipe coupling of any of paragraphs 4 to 13, wherein at least the blade edge sections are formed of sheet material, optionally a metal sheet.

15. The pipe coupling of any of paragraphs 1 to 14, wherein the blade elements together form a substantially-continuous annular ring.

16. The pipe coupling of any of paragraphs 1 to 15, wherein the blade elements are located at spaced circumferential locations about the at least one gripper ring, optionally the blade elements have a space therebetween of at least half the width of the blade elements, optionally at least the width of the blade elements, and optionally at least twice the width of the blade elements.

17. The pipe coupling of any of paragraphs 1 to 3, wherein the blade elements are each substantially annular and arranged in spaced axial relation, so as to engage the external surface of the pipe at spaced locations along a length thereof.

18. The pipe coupling of paragraph 17, wherein the blade elements each have a first, engagement face, which is configured to engage the wall of the pipe to prevent the pipe being withdrawn from the pipe coupling, and a cutting face which is inclined in relation to the engagement face, with a junction of the engagement and cutting faces providing a blade edge which is insertable into the external surface of the pipe.

19. The pipe coupling of paragraph 18, wherein the engagement face extends within about 10 degrees of a plane orthogonal to the longitudinal axis of the pipe coupling, and optionally within about 5 degrees of a plane orthogonal to the longitudinal axis of the pipe coupling, optionally substantially orthogonally to the longitudinal axis of the pipe coupling.

20. The pipe coupling of paragraph 18 or 19, wherein the cutting face encloses an angle ($\delta$) of greater than about 45 degrees with the longitudinal axis of the pipe coupling, optionally greater than about 55 degrees of the longitudinal axis of the pipe coupling, optionally less than about 75 degrees with the longitudinal axis of the pipe coupling, optionally less than about 65 degrees with the longitudinal axis of the pipe coupling.

21. The pipe coupling of any of paragraphs 1 to 20, wherein the blade elements together define an inner opening which has a diameter greater than an outer diameter of the external wall of the pipe prior to application of the clamp, and the diameter of the inner opening allows the pipe to be at least 3% out of round from a nominal outer diameter of the pipe, optionally at least 5% out of round.

22. The pipe coupling of any of paragraphs 1 to 21, wherein the blade elements are inserted to a depth (d) into the external wall of the pipe, with the insertion depth (d) being less than 10% of the thickness of the external wall of the pipe.

23. The pipe coupling of any of paragraphs 1 to 22, wherein the blade elements are formed of sheet material, optionally a metal sheet.

24. The pipe coupling of any of paragraphs 1 to 23, wherein the gripper is formed from a single sheet, optionally with adjacent ones of the blade elements being interconnected by webs, optionally in the form of strips.

25. The pipe coupling of paragraph 24, wherein the webs are inclined so as to promote preferential bending of the webs during application of the clamp.

26. The pipe coupling of any of paragraphs 1 to 23, wherein the blade elements are separate elements which are not interconnected.

27. The pipe coupling of any of paragraphs 1 to 26, wherein the blade elements each comprise at least one insertion depth guide which is disposed in relation to the blade edge, such that, on insertion of the blade edge to a required extent into the external wall of the pipe, the at least one guide abuts the external wall of the pipe.

28. The pipe coupling of paragraph 27, wherein the blade elements each comprise a plurality of insertion depth guides.

29. The pipe coupling of any of paragraphs 1 to 28, wherein the gripper has free distal ends, which allow for an inner diameter of the gripper to be reduced on clamping.

30. The pipe coupling of paragraph 29, wherein the distal ends of the gripper are interconnected by a deformable web, optionally the web comprises a rib.

31. The pipe coupling of any of paragraphs 1 to 30, wherein the gripper is formed of stainless steel or a coated mild steel.

32. The gripper ring of any of paragraphs 1 to 31, wherein the gripper ring is formed as a single, integral part.

33. The pipe coupling of any of paragraphs 1 to 32, wherein the gripper ring is formed of stainless steel or a coated mild steel.

34. The pipe coupling of any of paragraphs 1 to 33, wherein the clamp comprises an annular body which includes at least one recess which captively receives the at least one gripper ring.

35. The pipe coupling of paragraph 34, wherein the at least one recess is defined by flange members which are spaced in longitudinal relation.

36. The pipe coupling of paragraph 35, wherein the at least one gripper ring has an outwardly-facing support surface which is inclined or tapered in relation to the longitudinal axis of the pipe coupling, and the at least one recess in the clamp includes an inwardly-facing support surface, which supports the support surface of the respective gripper ring and is inclined or tapered to the longitudinal axis of the pipe coupling, tapering radially inwardly in a direction away from the distal end of the pipe.

37. The pipe coupling of paragraph 36, wherein the support surface of the carrier and the support surface of the clamp enclose an angle (ø) of greater than 0 degrees and less than 45 degrees in relation to the longitudinal axis of the pipe coupling, optionally greater than about 5 degrees, optionally less than about 30 degrees.

38. The pipe coupling of any of paragraph 1 to 37, wherein the carrier comprises at least one carrier member which supports the gripper.

39. The pipe coupling of paragraph 38, wherein the at least one carrier comprises a plurality of recesses which support respective ones of the blade elements.

40. The pipe coupling of paragraph 38 or 39, wherein the carrier comprises a single, substantially annular carrier member.

41. The pipe coupling of paragraph 40, wherein the annular carrier member comprises first and second supports which act to sandwich the gripper therebetween.

42. The pipe coupling of paragraph 41, wherein the supports each have a support surface, and the supports receive the blade elements therebetween, so as to orient the blade elements.

43. The pipe coupling of paragraph 38 or 39, wherein the carrier comprises a plurality of carrier members which together define an annulus.

44. The pipe coupling of paragraph 43, wherein the carrier members are interconnected, optionally interengaged.

45. The pipe coupling of paragraph 44, wherein the carrier members each have first and second engagement features, optionally male and female features, by which adjacent ones of the carrier members are interengaged.

46. The pipe coupling of any of paragraphs 1 to 45, wherein the clamp has a recess which receives the carrier, the recess having first and second opposed, axial faces and an inner radial face, and the carrier members each having oppositely-directed, first and second side axial faces which engage the axial faces of the recess in the clamp, oppositely-directed, first and second end circumferential faces and oppositely-directed, inner and outer radial faces, with the axial faces of the recess in the clamp and the axial faces of the carrier members being of corresponding tapered or wedge shape, maintaining the carrier members in a fixed orientation in relation to the pipe during application of the clamp.

47. The pipe coupling of paragraph 46, wherein the recess in the clamp and the carrier members are configured to allow for outward radial displacement of the carrier members in relation to clamp during the application of the clamp.

48. The pipe coupling of paragraph 46 or 47, wherein one, first faces of the recess in the clamp and the carrier members extend in a plane which is substantially perpendicular to the longitudinal axis of the pipe coupling, and other, second faces of the recess in the clamp and the carrier members are inclined outwardly in relation to the one, first faces of the recess and the carrier members.

49. The pipe coupling of any of paragraphs 46 to 48, wherein at least one of the axial faces of the carrier members has at least one first deformable element, which is configured to maintain the relative orientation of the carrier members in the recess in the clamp but is deformable on application of the clamp so as to enable the carrier members to be displaced radially outwardly into the recess in the clamp.

50. The pipe coupling of paragraph 49, wherein the at least one first deformable element is integrally formed with the carrier member.

51. The pipe coupling of paragraph 49 or 50, wherein the at least one axial face of the carrier member includes a plurality of first deformable elements, optionally formed as an array of projections.

52. The pipe coupling of any of paragraphs 49 to 51, wherein the carrier members each include at least one second deformable element, which is configured to engage the inner radial face of the recess in the clamp and be deformed with increasing application of the clamp.

53. The pipe coupling of paragraph 52, wherein the carrier members each include a plurality of second deformable elements.

54. The pipe coupling of any of paragraphs 1 to 53, wherein the pipe coupling comprises a plurality of grippers which are arranged in spaced axial relation, optionally stacked relation.

55. The pipe coupling of any of paragraphs 1 to 54, wherein the pipe coupling comprises a plurality of gripper rings which are arranged in spaced axial relation.

56. The pipe coupling of any of paragraphs 1 to 55, further comprising:

a coupling member which is connected to the clamp and provides for connection to a pipe component, optionally the coupling member comprises a flange adaptor.

57. The pipe coupling of any of paragraphs 1 to 56, further comprising:

an annular seal for maintaining a fluid-tight seal with the external wall of the pipe.

58. The pipe coupling of paragraph 57, wherein the seal is a lip seal.

59. A gripper ring for a pipe connector or coupling which receives a pipe therewithin, wherein the gripper ring comprises a gripper which includes a plurality of blade elements which are displaceable between a first, pipe-receiving configuration in which the pipe is receivable within the gripper and a second, inwardly-displaced inserted configuration in which the blade elements are inserted into an external wall of the pipe.

60. The gripper ring of paragraph 59, further comprising a carrier which supports the gripper with a defined orientation.

61. The gripper ring of paragraph 59 or 60, wherein the blade elements are insertable into the wall of the pipe by cutting into the wall of the pipe.

62. The gripper ring of any of paragraphs 59 to 61, wherein the blade elements each have a main body section by which the blade element is supported, and an internal blade edge section which includes at least one blade edge which is inserted into the external wall of the pipe.

63. The gripper ring of paragraph 62, wherein the blade elements each have an external edge section by which the blade element is displaced inwardly.

64. The gripper ring of paragraph 62 or 63, wherein the blade edge section has a predetermined angle in relation to the longitudinal axis of the gripper ring, such that the blade edge sections are insertable into the external wall of the pipe at a predetermined angle thereto.

65. The gripper ring of paragraph 64, wherein the blade edge sections enclose an acute angle ($\beta$) with the longitudinal axis of the gripper ring rearwardly of the blade edges in relation to the distal end of the pipe.

66. The gripper ring of paragraph 65, wherein the angle ($\beta$) is at least about 50 degrees.

67. The gripper ring of paragraph 65, wherein the angle ($\beta$) is at least about 55 degrees.

68. The gripper ring of any of paragraphs 65 to 67, wherein the angle ($\beta$) is not greater than about 80 degrees.

69. The gripper ring of paragraph 65, wherein the angle ($\beta$) is between about 60 degrees and about 70 degrees.

70. The gripper ring of any of paragraphs 62 to 69, wherein the blade edge sections each comprise first and second spaced blade edges.

71. The gripper ring of paragraph 70, wherein the first and second blade edges are coupled by a web, optionally of V shape.

72. The gripper ring of any of paragraphs 62 to 71, wherein at least the blade edge sections are formed of sheet material, optionally a metal sheet.

73. The gripper ring of any of paragraphs 59 to 72, wherein the blade elements together form a substantially-continuous annular ring.

74. The gripper ring of any of paragraphs 59 to 73, wherein the blade elements are located at spaced circumferential locations about the at least one gripper ring, optionally the blade elements have a space therebetween of at least half the width of the blade elements, optionally at least the width of the blade elements, and optionally at least twice the width of the blade elements.

75. The gripper ring of any of paragraphs 59 to 61, wherein the blade elements are each substantially annular and arranged in spaced axial relation, so as to engage the external surface of the pipe at spaced locations along a length thereof.

76. The gripper ring of paragraph 75, wherein the blade elements each have a first, engagement face, which is configured to engage the wall of the pipe to prevent the pipe being withdrawn from the gripper ring, and a cutting face which is inclined in relation to the engagement face, with a junction of the engagement and cutting faces providing a blade edge which is insertable into the external surface of the pipe.

77. The gripper ring of paragraph 76, wherein the engagement face extends within about 10 degrees of a plane orthogonal to the longitudinal axis of the gripper ring, and optionally within about 5 degrees of a plane orthogonal to the longitudinal axis of the gripper ring, optionally substantially orthogonally to the longitudinal axis of the gripper ring.

78. The gripper ring of paragraph 76 or 77, wherein the cutting face encloses an angle ($\delta$) of greater than about 45 degrees with the longitudinal axis of the gripper ring, optionally greater than about 55 degrees of the longitudinal axis of the gripper ring, optionally less than about 75 degrees with the longitudinal axis of the gripper ring, optionally less than about 65 degrees with the longitudinal axis of the gripper ring.

79. The gripper ring of any of paragraphs 59 to 78, wherein the blade elements together define an inner opening which has a diameter greater than an outer diameter of the external wall of the pipe, and the diameter of the inner opening allows the pipe to be at least 3% out of round from a nominal outer diameter of the pipe, optionally at least 5% out of round.

80. The gripper ring of any of paragraphs 59 to 79, wherein the blade elements are insertable to a depth (d) into the external wall of the pipe, with the insertion depth (d) being less than 10% of the thickness of the external wall of the pipe.

81. The gripper ring of any of paragraphs 59 to 80, wherein the blade elements are formed of sheet material, optionally a metal sheet.

82. The gripper ring of any of paragraphs 59 to 81, wherein the gripper is formed from a single sheet, optionally with adjacent ones of the blade elements being interconnected by webs, optionally in the form of strips.

83. The gripper ring of paragraph 82, wherein the webs are inclined so as to promote preferential bending of the webs during application of the clamp.

84. The gripper ring of any of paragraphs 59 to 81, wherein the blade elements are separate elements which are not interconnected.

85. The gripper ring of any of paragraphs 59 to 84, wherein the blade elements each comprise at least one insertion depth guide which is disposed in relation to the blade edge, such that, on insertion of the blade edge to a required extent into the external wall of the pipe, the at least one guide abuts the external wall of the pipe.

86. The gripper ring of paragraph 85, wherein the blade elements each comprise a plurality of insertion depth guides.

87. The gripper ring of any of paragraphs 59 to 86, wherein the gripper has free distal ends, which allow for an inner diameter of the gripper to be reduced on clamping.

88. The gripper ring of paragraph 87, wherein the distal ends of the gripper are interconnected by a deformable web, optionally the web comprises a rib.

89. The gripper ring of any of paragraphs 59 to 88, wherein the gripper is formed of stainless steel or a coated mild steel.

90. The gripper ring of any of paragraphs 59 to 89, wherein the gripper ring is formed as a single, integral part.

91. The gripper ring of any of paragraphs 59 to 90, wherein the gripper ring is formed of stainless steel or a coated mild steel.

92. The gripper ring of any of paragraphs 59 to 91, including an outwardly-facing support surface which is inclined or tapered in relation to the longitudinal axis of the gripper ring, tapering radially inwardly in a direction away from the distal end of the pipe.

93. The gripper ring of paragraph 92, wherein the support surface encloses an angle (ø) of greater than 0 degrees and less than 45 degrees in relation to the longitudinal axis of the gripper ring, optionally greater than about 5 degrees, optionally less than about 30 degrees.

94. The gripper ring of any of paragraphs 59 to 93, wherein the carrier comprises at least one carrier member which supports the gripper.

95. The gripper ring of paragraph 94, wherein the at least one carrier comprises a plurality of recesses which support respective ones of the blade elements.

96. The gripper ring of paragraph 94 or 95, wherein the carrier comprises a single, substantially annular carrier member.

97. The gripper ring of paragraph 96, wherein the annular carrier member comprises first and second supports which act to sandwich the gripper therebetween.

98. The gripper ring of paragraph 97, wherein the supports each have a support surface, and the supports receive the blade elements therebetween, so as to orient the blade elements.

99. The gripper ring of paragraph 97 or 98, wherein the carrier comprises a plurality of carrier members which together define an annulus.

100. The gripper ring of paragraph 99, wherein the carrier members are interconnected, optionally interengaged.

101. The gripper ring of paragraph 100, wherein the carrier members each have first and second engagement features, optionally male and female features, by which adjacent ones of the carrier members are interengaged.

102. The gripper ring of any of paragraphs 94 to 101, wherein the carrier members each having oppositely-directed, first and second side axial faces, oppositely-directed, first and second end circumferential faces and oppositely-directed, inner and outer radial faces, with the axial faces of the carrier members being of corresponding tapered or wedge shape, maintaining the carrier members in a fixed orientation in relation to the pipe during application of the clamp.

103. The gripper ring of paragraph 102, wherein one, first faces of the carrier members extend in a plane which is substantially perpendicular to the longitudinal axis of the gripper ring, and other, second faces of the carrier members are inclined outwardly in relation to the one, first faces of the carrier members.

104. The gripper ring of paragraph 102 or 103, wherein at least one of the axial faces of the carrier members has at least one first deformable element, which is deformable on clamping.

105. The gripper ring of paragraph 104, wherein the at least one first deformable element is integrally formed with the carrier member.

106. The gripper ring of paragraph 104 or 105, wherein the at least one axial face of the carrier member includes a plurality of first deformable elements, optionally formed as an array of projections.

107. The gripper ring of any of paragraphs 104 to 106, wherein the carrier members each include at least one second deformable element, which is deformable on clamping.

108. The gripper ring of paragraph 107, wherein the carrier members each include a plurality of second deformable elements.

109. The gripper ring of any of paragraphs 59 to 108, comprising a plurality of grippers which are arranged in spaced axial relation, optionally stacked relation.

110. A carrier member for a pipe connector or coupling, wherein the carrier member includes a recess for receiving a blade element and has first and second side axial faces for engaging a recess in a clamp, first and second end circumferential faces and inner and outer radial faces, with the axial faces defining a tapered or wedge shape.

111. The carrier member of paragraph 110, wherein at least one of the axial faces has at least one first deformable element, which is configured to be deformable on application of the clamp.

112. The carrier member of paragraph 111, wherein the at least one first deformable element is integrally formed with a body of the carrier member.

113. The carrier member of paragraph 111 or 112, wherein the at least one axial face of the carrier member includes a plurality of first deformable elements, optionally formed as an array of projections.

114. The carrier member of any of paragraphs 110 to 113, wherein the outer radial face of the carrier member includes at least one second deformable element, which is configured to be deformable on application of the clamp.

115. The carrier member of paragraph 114, wherein the carrier members each include a plurality of second deformable elements.

116. The carrier member of any of paragraphs 110 to 115 in combination with a blade element, wherein the blade element has a main body section by which the blade element is supported in the recess, and an internal blade edge section which includes at least one blade edge which is inserted into the external wall of the pipe.

117. The combination of paragraph 116, wherein the blade edge section comprises first and second spaced blade edges.

118. The combination of paragraph 117, wherein the first and second blade edges are coupled by a web, optionally of V shape.

119. The combination of any of paragraphs 116 to 118, wherein the blade elements are formed of sheet material, optionally a metal sheet.

120. The combination of any of paragraphs 116 to 119, wherein at least the inner edge sections of the blade elements are formed of sheet material, optionally a metal sheet.

The invention claimed is:

1. A pipe connector or coupling for providing a coupling to a pipe, the pipe coupling comprising:
at least one gripper ring which receives a pipe therewithin, wherein the at least one gripper ring comprises a gripper which includes a plurality of blade elements which are displaceable between a first, pipe-receiving configuration in which the pipe is receivable within the at least one gripper ring and a second, inwardly-displaced inserted configuration in which the blade elements are inserted into an external wall of the pipe; and
a clamp for applying a radially-inward compressive load on the at least one gripper ring to displace the blade elements thereof from the pipe-receiving configuration to the inserted configuration;

wherein the blade elements each have a main body section by which the blade element is supported, and an internal blade edge section which includes at least one blade edge which is inserted into the external wall of the pipe, with at least the internal blade edge sections being formed of sheet material; and wherein:
(I) the blade elements each have an external edge section by which the blade element is displaced inwardly during operation of the clamp;
(II) the internal blade edge section has a predetermined angle in relation to the longitudinal axis of the pipe coupling, such that the internal blade edge sections are inserted into the external wall of the pipe at a predetermined angle thereto;
(Ill) the blade elements together define an annulus;
(IV) the blade elements are located at spaced circumferential locations about the at least one gripper ring, the blade elements having a space therebetween of at least half the width of the blade elements;
(V) the blade elements together define an inner opening which has a diameter greater than an outer diameter of the external wall of the pipe prior to application of the clamp, and the diameter of the inner opening allows the pipe to be at least 3% out of round from a nominal outer diameter of the pipe;
(VI) the blade elements are inserted to a depth (d) into the external wall of the pipe, with the insertion depth (d) being less than 10% of the thickness of the external wall of the pipe;
(VII) the blade elements are formed of sheet material;
(VIII) the gripper is formed from a single sheet, with adjacent ones of the blade elements being interconnected by webs;
(IX) the blade elements are separate elements which are not interconnected; and/or
(X) the blade elements each comprise at least one insertion depth guide which is disposed in relation to the at least one blade edge, such that, on insertion of the at least one blade edge to a required extent into the external wall of the pipe, the at least one insertion depth guide abuts the external wall of the pipe.

2. The pipe coupling of claim 1, wherein the at least one gripper ring comprises a carrier which supports the gripper with a defined orientation.

3. The pipe coupling of claim 1, wherein:
(I) the pipe coupling comprises a plurality of grippers which are arranged in spaced axial relation; and/or
(II) the pipe coupling comprises a plurality of gripper rings which are arranged in spaced axial relation.

4. The pipe coupling of claim 1, further comprising: a coupling member which is connected to the clamp and provides for connection to a pipe component; and/or an annular seal for maintaining a fluid-tight seal with the external wall of the pipe.

5. A pipe connector or coupling for providing a coupling to a pipe, the pipe coupling comprising:
at least one gripper ring which receives a pipe therewithin, wherein the at least one gripper ring comprises a gripper which includes a plurality of blade elements which are displaceable between a first, pipe-receiving configuration in which the pipe is receivable within the at least one gripper ring and a second, inwardly-displaced inserted configuration in which the blade elements are inserted into an external wall of the pipe; and
a clamp for applying a radially-inward compressive load on the at least one gripper ring to displace the blade elements thereof from the pipe-receiving configuration to the inserted configuration;
wherein the blade elements each have a main body section by which the blade element is supported, and an internal blade edge section which includes at least one blade edge which is inserted into the external wall of the pipe, with at least the internal blade edge sections being formed of sheet material, wherein:
(I) the gripper ring is formed as a single, integral part;
(II) the gripper ring is formed of stainless steel or a coated mild steel;
(III) the clamp comprises an annular body which includes at least one recess which captively receives the at least one gripper ring, the at least one recess being defined by flange members which are spaced in longitudinal relation, and the at least one gripper ring has an outwardly-facing support surface which is inclined or tapered in relation to the longitudinal axis of the pipe coupling, and the at least one recess in the clamp includes an inwardly-facing support surface, which supports the support surface of the at least one gripper ring and is inclined or tapered to the longitudinal axis of the pipe coupling, tapering radially inwardly in a direction away from the distal end of the pipe; and/or
(IV) the at least one gripper ring comprises a carrier which comprises at least one carrier member which supports the gripper.

6. A pipe connector or coupling for providing a coupling to a pipe, the pipe coupling comprising:
at least one gripper ring which receives a pipe therewithin, wherein the at least one gripper ring comprises a gripper which includes a plurality of blade elements which are displaceable between a first, pipe-receiving configuration in which the pipe is receivable within the at least one gripper ring and a second, inwardly-displaced inserted configuration in which the blade elements are inserted into an external wall of the pipe; and
a clamp for applying a radially-inward compressive load on the at least one gripper ring to displace the blade elements thereof from the pipe-receiving configuration to the inserted configuration;
wherein the blade elements each have a main body section by which the blade element is supported, and an internal blade edge section which includes at least one blade edge which is inserted into the external wall of the pipe, with at least the internal blade edge sections being formed of sheet material;
wherein the at least one gripper ring comprises a carrier which supports the gripper with a defined orientation
wherein the clamp has a recess which receives the carrier, the recess having first and second opposed, axial faces and an inner radial face, and the carrier comprises a plurality of carrier members each having oppositely-directed, first and second side axial faces which engage the axial faces of the recess in the clamp, oppositely-directed, first and second end circumferential faces and oppositely-directed, inner and outer radial faces, with the axial faces of the recess in the clamp and the axial faces of the carrier members being of corresponding tapered or wedge shape, maintaining the carrier members in a fixed orientation in relation to the pipe during application of the clamp, the recess in the clamp and the carrier members being configured to allow for outward radial displacement of the carrier members in relation to clamp during the application of the clamp.

7. A gripper ring for a pipe connector or coupling which receives a pipe therewithin, wherein the gripper ring comprises a gripper which includes a plurality of blade elements which are displaceable between a first, pipe-receiving configuration in which the pipe is receivable within the gripper and a second, inwardly-displaced inserted configuration in which the blade elements are inserted into an external wall of the pipe, wherein the blade elements each have a main body section by which the blade element is supported, and an internal blade edge section which includes at least one blade edge which is inserted into the external wall of the pipe, with at least the internal blade edge sections being formed of sheet material; and wherein:
- (I) the blade elements each have an external edge section by which the blade element is displaced inwardly during operation of the clamp;
- (II) the internal blade edge section has a predetermined angle in relation to the longitudinal axis of the gripper ring, such that the internal blade edge sections are insertable into the external wall of the pipe at a predetermined angle thereto;
- (III) the blade elements together define an annulus;
- (IV) the blade elements are located at spaced circumferential locations about the at least one gripper ring, the blade elements having a space therebetween of at least half the width of the blade elements;
- (V) the blade elements together define an inner opening which has a diameter greater than an outer diameter of the external wall of the pipe, and the diameter of the inner opening allows the pipe to be at least 3% out of round from a nominal outer diameter of the pipe;
- (VI) the blade elements are insertable to a depth (d) into the external wall of the pipe, with the insertion depth (d) being less than 10% of the thickness of the external wall of the pipe;
- (VII) the blade elements are formed of sheet material;
- (VIII) the gripper is formed from a single sheet, with adjacent ones of the blade elements being interconnected by webs;
- (IX) the blade elements are separate elements which are not interconnected; and/or
- (X) the blade elements each comprise at least one insertion depth guide which is disposed in relation to the at least one blade edge, such that, on insertion of the at least one blade edge to a required extent into the external wall of the pipe, the at least one insertion depth guide abuts the external wall of the pipe.

8. The gripper ring of claim 7, further comprising a carrier which supports the gripper with a defined orientation.

9. The gripper ring of claim 7, wherein:
- (I) the gripper has free distal ends, which allow for an inner diameter of the gripper to be reduced on clamping;
- (II) the gripper ring is formed as a single, integral part; and/or
- (III) the gripper ring is formed of stainless steel or a coated mild steel.

10. The gripper ring of claim 7, including an outwardly-facing support surface which is inclined or tapered in relation to the longitudinal axis of the gripper ring, tapering radially inwardly in a direction away from the distal end of the pipe, the support surface enclosing an angle (ø) of greater than 0 degrees and less than 45 degrees in relation to the longitudinal axis of the gripper ring.

11. The gripper ring of claim 7, wherein the at least one gripper ring comprises a carrier which comprises at least one carrier member which supports the gripper.

12. A carrier member for a pipe connector or coupling, wherein the carrier member includes a recess having a gripper which includes a plurality of blade elements supported therein, and has first and second side axial faces for engaging a recess in a clamp, first and second end circumferential faces and inner and outer radial faces, with the axial faces defining a tapered or wedge shape, wherein the blade elements have a main body section by which the blade elements are supported, and an internal blade edge section which includes at least one blade edge which is inserted into the external wall of the pipe, with at least the internal blade edge section being formed of sheet material; and wherein:
- (I) the blade elements each have an external edge section by which the blade element is displaced inwardly during operation of the clamp;
- (II) the internal blade edge section has a predetermined angle in relation to the longitudinal axis of the pipe coupling, such that the internal blade edge sections are inserted into the external wall of the pipe at a predetermined angle thereto;
- (III) the blade elements together define an annulus;
- (IV) the blade elements are located at spaced circumferential locations about the at least one gripper ring, the blade elements having a space therebetween of at least half the width of the blade elements;
- (V) the blade elements together define an inner opening which has a diameter greater than an outer diameter of the external wall of the pipe prior to application of the clamp, and the diameter of the inner opening allows the pipe to be at least 3% out of round from a nominal outer diameter of the pipe;
- (VI) the blade elements are inserted to a depth (d) into the external wall of the pipe, with the insertion depth (d) being less than 10% of the thickness of the external wall of the pipe;
- (VII) the blade elements are formed of sheet material;
- (VIII) the gripper is formed from a single sheet, with adjacent ones of the blade elements being interconnected by webs;
- (IX) the blade elements are separate elements which are not interconnected; and/or
- (X) the blade elements each comprise at least one insertion depth guide which is disposed in relation to the at least one blade edge, such that, on insertion of the at least one blade edge to a required extent into the external wall of the pipe, the at least one insertion depth guide abuts the external wall of the pipe.

13. The carrier member of claim 12, wherein the internal blade edge section comprises first and second spaced blade edges.

* * * * *